United States Patent

Pearson

[15] 3,704,451

[45] Nov. 28, 1972

[54] AUTOMATIC DATA RETRIEVAL AND DISPLAY SYSTEM

[72] Inventor: Samuel Reader Pearson, Farmers Branch, Tex.

[73] Assignee: Texas Instruments Incorporated, Dallas, Tex.

[22] Filed: Jan. 5, 1971

[21] Appl. No.: 104,038

[52] U.S. Cl. ....................................340/172.5, 353/25

[51] Int. Cl. ..............................................G11b 13/00

[58] Field of Search ......340/172.5; 235/157; 353/25, 353/27

[56] References Cited

UNITED STATES PATENTS

| | | |
|---|---|---|
| 3,596,253 | 7/1971 | Ruth et al. ...............340/172.5 |
| 3,585,597 | 6/1971 | Holmerud................340/172.5 |
| 3,453,384 | 7/1969 | Donner et al............340/172.5 |
| 3,438,000 | 4/1969 | Irasek......................340/172.5 |
| 3,332,071 | 7/1967 | Goldman et al. ........340/172.5 |
| 3,191,006 | 6/1965 | Avakian..............340/172.5 X |
| 3,292,489 | 12/1965 | Johnson et al......340/172.5 X |

*Primary Examiner*—Paul J. Henon
*Assistant Examiner*—Mark Edward Nusbaum
*Attorney*—James O. Dixon, Andrew M. Hassell, Melvin Sharp, Michael A. Sileo, Jr., Henry T. Olsen, Gary C. Honeycutt, Richard L. Donaldson and John E. Vandigriff

[57] ABSTRACT

An automatic data retrieval and display system is disclosed wherein solid state logic, motor drives and solenoid drives are utilized. Logic and drive circuitry control operation of a rotary file to rapidly select a desired data item from the file and accurately position it for display. Transistorized d.c. isolator circuit means isolate logic signals from a.c. drive power while servo positioning circuits effect positioning of the data item for display with maximum speed. A timing circuit provides a reset signal after a programmable delay.

7 Claims, 15 Drawing Figures

INVENTOR
Samuel Reader Pearson

AUTOMATIC DATA RETRIEVAL AND DISPLAY SYSTEM

BACKGROUND INFORMATION AND SUMMARY OF INVENTION

Compact automatic data retrieval display systems have a variety of applications in industry. One such system comprises a desk top, self-contained microfische file reader wherein a rotary storage file provides microfische storage for the internal file of the system. When it is desired to view a preselected microfische, the code of that microfische is entered via a keyboard and a view button is activated to initiate a view cycle. Electro-mechanical relays and logic circuitry are thereby activated to control operation of the file so that the desired microfische may be selected. When the desired microfische is rotated to a position adjacent to the display means, additional circuitry is activated to stop the file, spread the microfische apart so that the desired microfische is exposed for easy access, and to automatically position the microfische to an index display position. Each microfische, for example, may have 98 separate frames of microfilm. The index position catalogues the contents of the other 97 frames. From this index the user can select the frame he wishes to view and enter the coordinate location of that frame via a second keyboard to control X, Y servo motors that position the microfische so that the desired frame is displayed.

Conventional automatic retrieval display systems as above described utilize numerous mechanical relays and other electro-mechanical devices. This results in inaccurate positioning of the microfische and also contributes to numerous mechanical failures. In addition, contact arcing and contact wear of the relays reduce the system meantime before failure. Also, mechanical devices have a relatively slow response, resulting in unacceptably long microfische access times.

Accordingly an object of the present invention is to produce a compact automatic data retrieval and display system in which the logic and drive circuitry is completely solid state.

An additional object of the present invention is to produce a compact automatic retrieval display system having improved meantime before failure characteristics.

A further object of the present invention is to provide a data retrieval system having reduced access time to selected data.

Briefly and in accordance with the present invention, an automatic data retrieval and display system is disclosed in which all solid state logic and solid state motor drives and solenoid drives are utilized. A rotary storage file provides a preselected storage capability for discrete data items such as microfische. Control and drive circuitry energize the file motor and drive the file at full speed until the desired microfische revolves into close proximity to the display means. The desired microfische is addressed by selector means which provide a signal to the rotary file motor drive circuitry which slows the file to an intermediate regulated speed. Rotary file motor drive logic senses the file speed and an integrator portion of the circuitry ensures that the file stops in a precise position such that the selected microfische is in position for retrieval. The system also includes spreader control logic circuits for controlling operation of the spreader mechanism. A solid state isolation circuit is utilized to control the spreader drive and separate d.c. logic level signals from a.c. drive voltages. Drive and logic circuitry also controls the X, Y servo positioning apparatus enabling faster positioning time. A timing circuit is provided to terminate a view cycle after a preselected time during which no microfische is selected. Load logic circuits provide convenient indexing of selected microfische for removal from the file storage.

Novel features believed to be characteristic of this invention are set forth in the appended claims.

The invention itself, however, as well as other objects and advantages thereof may best be understood when read in conjunction with the following detailed description of illustrative embodiments by reference to the accompanying drawings in which.

DETAILED DESCRIPTION

Figure 1:
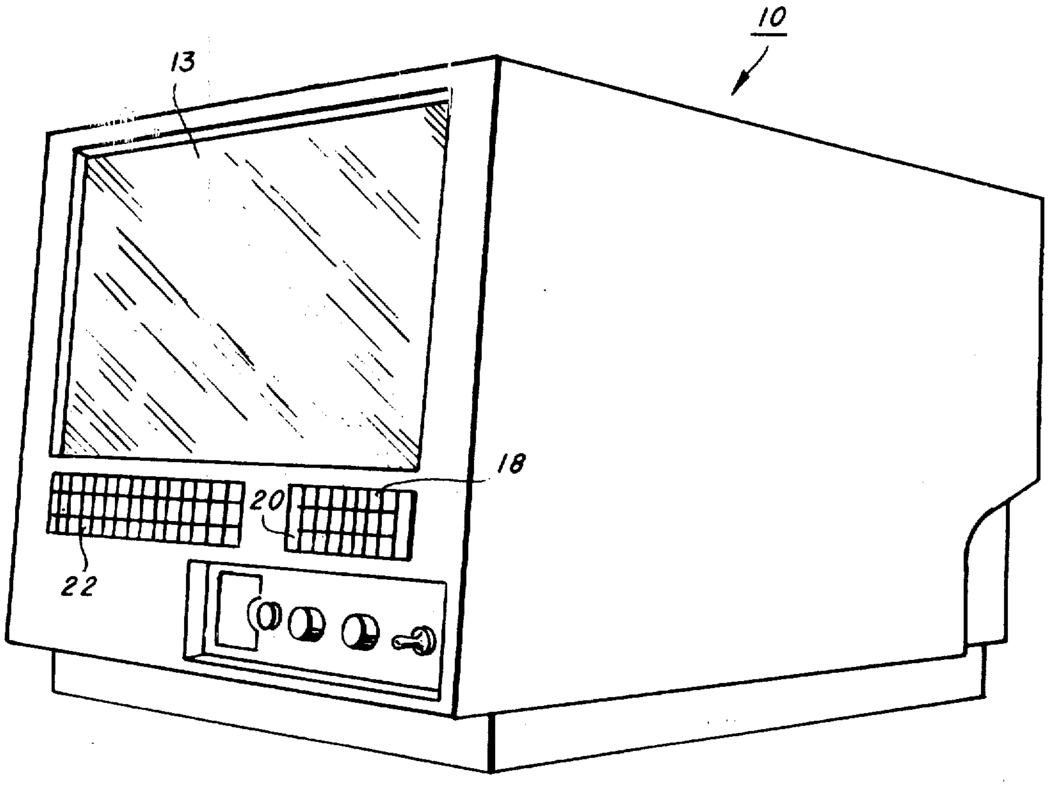
FIGS. 1 and 1A are pictorial illustrations of a compact automatic data retrieval system in which the solid state drive and logic circuits of the present invention may be utilized.
Figure 2:
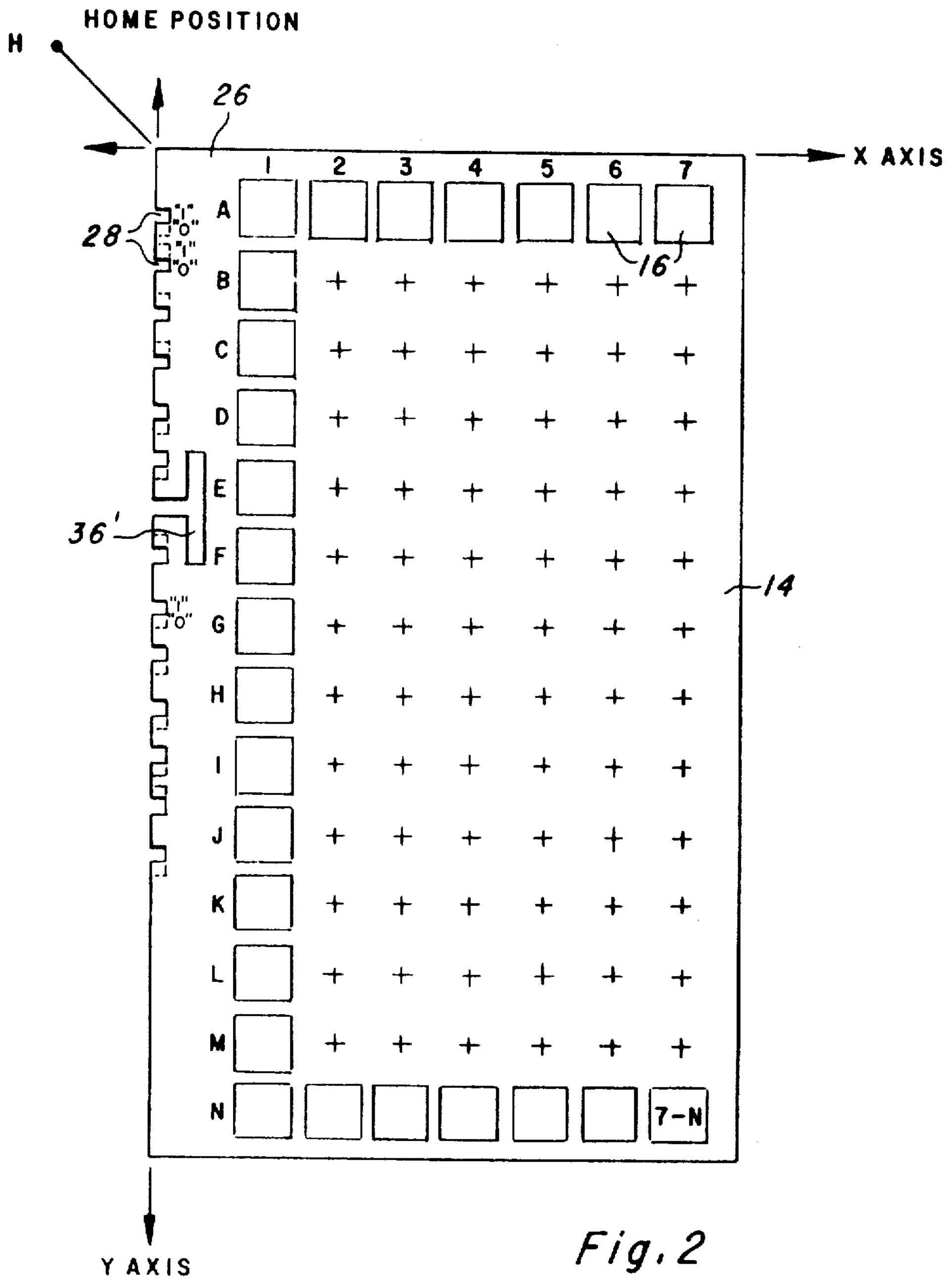
FIG. 2 illustrates a microfische that may be utilized with the data retrieval system shown in FIG. 1.

Referring now to the drawings and for the present particularly to FIGS. 1 and 2, there is pictorially illustrated an illustrative embodiment of the present invention. A compact automatic data retrieval display system is shown generally at 10. A microfische rotary file storage unit is shown at 12. This unit comprises the internal data storage capability of the display system and may, for example, have a storage capability of 100 or more separate microfische. The file comprises a plurality of radially extending storage locations disposed around a central axis. A representative microfische is depicted in FIG. 2 at 14. The microfische contains a plurality of frames of microfilm shown generally at 16. In the example illustrated, the microfische 14 contains 98 separate frames of microfilm arranged in a coordinate 7 × 14 alphanumerically designated array. For, example, the frame in the upper lefthand corner of the microfische has a location defined by the coordinate position 1-A. In the preferred embodiment position 1-A is an index location and the logic circuits of the display system are arranged to automatically display the microfilm at that location whenever the microfische is initially selected. The index frame of microfilm catalogues the contents of the other 97 frames of microfilm on the microfische by coordinate location. Thus, the user can determine the coordinate location of the information he desires and effect display of this information by entering the location of the display keyboard 18 and pressing the view bar 20.

A discrete microfische may be selected for display utilizing a master index that provides the user with a code to enter via a second select keyboard 22. For example, in one application the file storage 12 may contain data relative to hotel reservations. The user may desire information about hotels in Miami, Florida. Referring to a master index under hotels, Florida, he would obtain a code, for example of "Hotel, A-3". In the given example, the keyboard 22 would have three sections corresponding to the type of data (i.e., hotels, etc.) and alphanumeric sections. The data would be entered on keyboard 22 and the view button 20 activated. A selector section 24 is activated responsive to the code entered via keyboard 22. The selector section 24, for example, may comprise 13 selector bars which may individually be activated or not to effect a 13-bit binary code. That is, if activated, a selector bar is moved in position and may represent a binary "1". If not activated, it remains stationary and represents a binary "0". Each microfische 14 has on the edge adjacent the selector section 24 a metal tab 26. Grooves, shown generally at 28, are formed in the edge of the metal tab 26 on each microfische 14 to correspond to a unique binary code for each microfische. Microfische 14 in FIG. 2 is illustrated as having a binary code of 1000110111101.

Assuming, in the above example, that this microfische corresponds to "Hotels, A-3" entered via keyboard 22, the selector bars of selector section 24 would be set to correspond to the binary code 1000110111101. The selector section 24 magnetically attracts the metal tab 26 of all of the microfische in the file 12 as they are rotated past the selector section. However, only the grooves of the selected microfische are aligned with the selector bars and only this microfische is withdrawn from the file storage position. The grooves 28, for example, may be about one-fourth of an inch in depth, allowing the microfische to be extracted this distance.

Responsive to the view bar 20 being depressed, a kicker bar 30 operates to push any previously selected microfische (which extends about one-fourth of an inch from the file) back into the storage position to prevent damage to the microfische during subsequent rotation of the file in search of the newly selected microfische. When the selected microfische is rotated so as to underlie the selector section 24, the microfische is pulled out about one-fourth of an inch and activates slow speed switch S1 which slows the file rotation to a predetermined regulated speed. As the microfische is rotated further, a second switch S2 is activated. This switch enables circuitry that stops the file rotation in a preselected location so that the selected microfische may be retrieved. A spreader 32 isolates the selected microfische from other microfische in the file storage and the X, Y servo mechanism, shown in block format 34, positions a hook 36 into a corresponding slot 36' of the microfische. The microfische at this location is said to be in the "home" position. The X, Y servo 34 then automatically positions the microfische against the platen 38 to display the index, that is, 1-A, frame of microfilm. Display optics 40 display the microfilm on the screen 13.

Referring again to the example, the index page may catalogue the coordinate location (on the microfische) of all the cities in Florida. Assume that Miami is contained on the frame of microfilm at location 1-K. This information would be entered via display keyboard 18 and would apply driving voltages proportional to the coordinate location to the X, Y servo motors. The desired frame of microfilm would be display about 1.2 seconds later.

FUNCTIONAL DESCRIPTION

Figure 3:
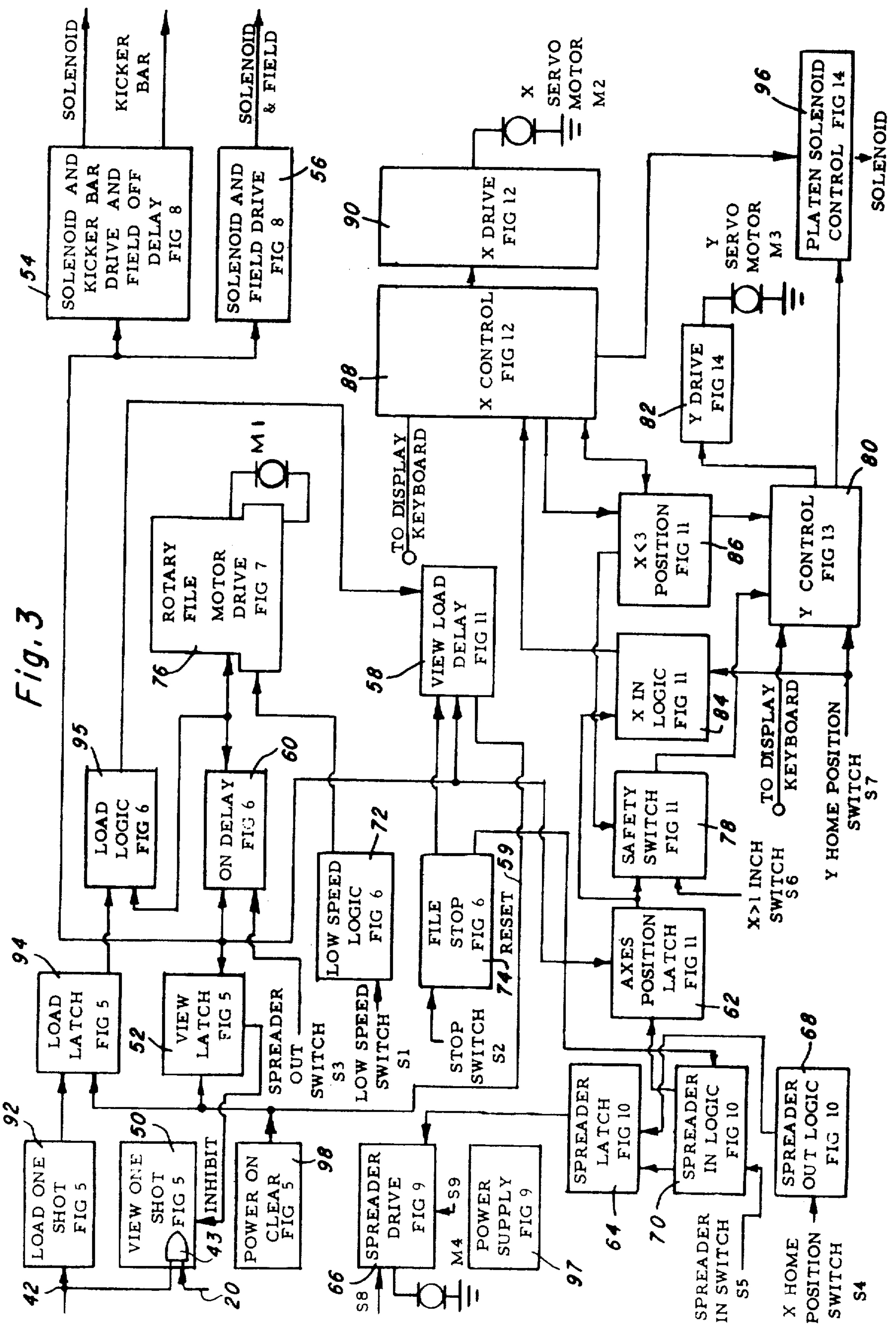
FIG. 3 depicts in functional block diagram format the logic and drive circuitry of the present invention.

Referring now to FIG. 3, there is depicted in functional block diagram format the logic and driving circuits of the compact automatic data retrieval and display system of the present invention. The data display system exhibits extremely fast data access and, since it utilizes all solid state logic and drive circuits, does not experience the large number of mechanical failures associated with conventional electro-mechanical display systems. The functional blocks will be described essentially in order of operation during a normal view cycle.

Figure 1A:
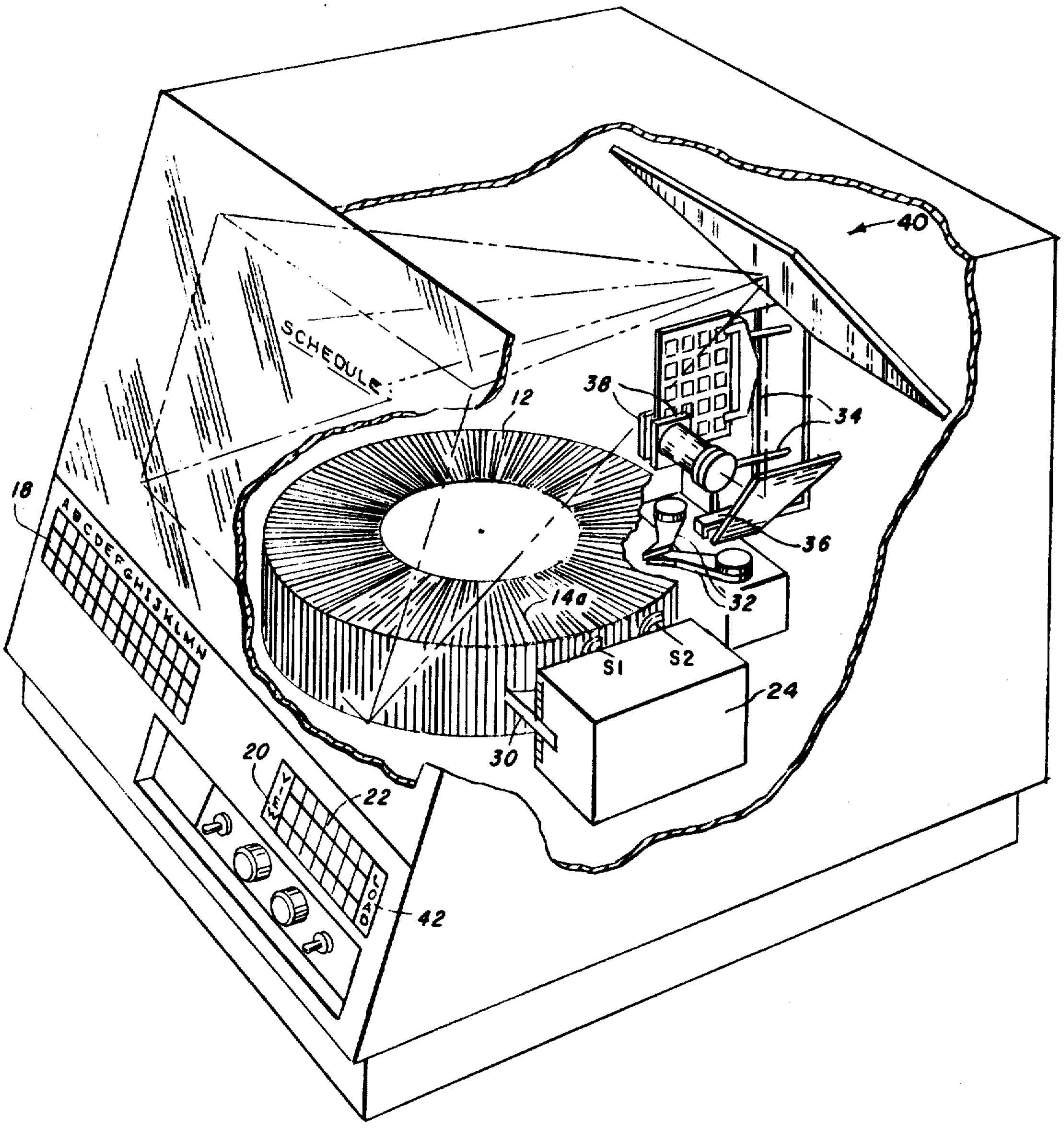

View One Shot — The function of the View One Shot circuit 50 is to provide a signal that initiates a "-view cycle" when either the "view" or "load" bars 20 or 42 of the keyboard 18 (FIG. 1A) are activated. Once a view cycle is activated, this circuit operates to inhibit subsequent signals responsive to inadvertent activation of either the view button or load button. At the end of a view cycle, the circuit 50 is enabled so that when either the view or load button is again depressed, a new view cycle may be initiated. The output of circuit 50 is a single pulse that is applied to the View Latch circuit 52. A pulse **120*b* (FIG. 4), resulting from either the view bar or load bar being activated during a view cycle, is descriptively labeled noise since it is inhibited by the View One Shot circuit 50** and has no effect on circuit operation.

View Latch — The View Latch 52 is enabled by the output pulse of the View One Shot circuit 50 and is set to a predetermined logic state responsive thereto. The latch 52 remains in this logic state until completion of the view cycle and during that time provides an "inhibit" signal to the View One Shot circuit 50 to preclude further "view cycle initiate" output pulses therefrom. When a view cycle is completed, the latch 52 is reset via a signal from the View Load Delay 58, thus removing the inhibit signal. The output of the latch 52 is an enable signal that persists until the latch is reset at the end of the view cycle. This enable signal is simultaneously applied to the On Delay circuit 60, the Solenoid and Kicker Bar Drive and Field Off Delay circuit 54, the Solenoid and Field Drive circuit 56, the View Load Delay circuit 58 and the Axes Position Latch 62.

Figure 4:
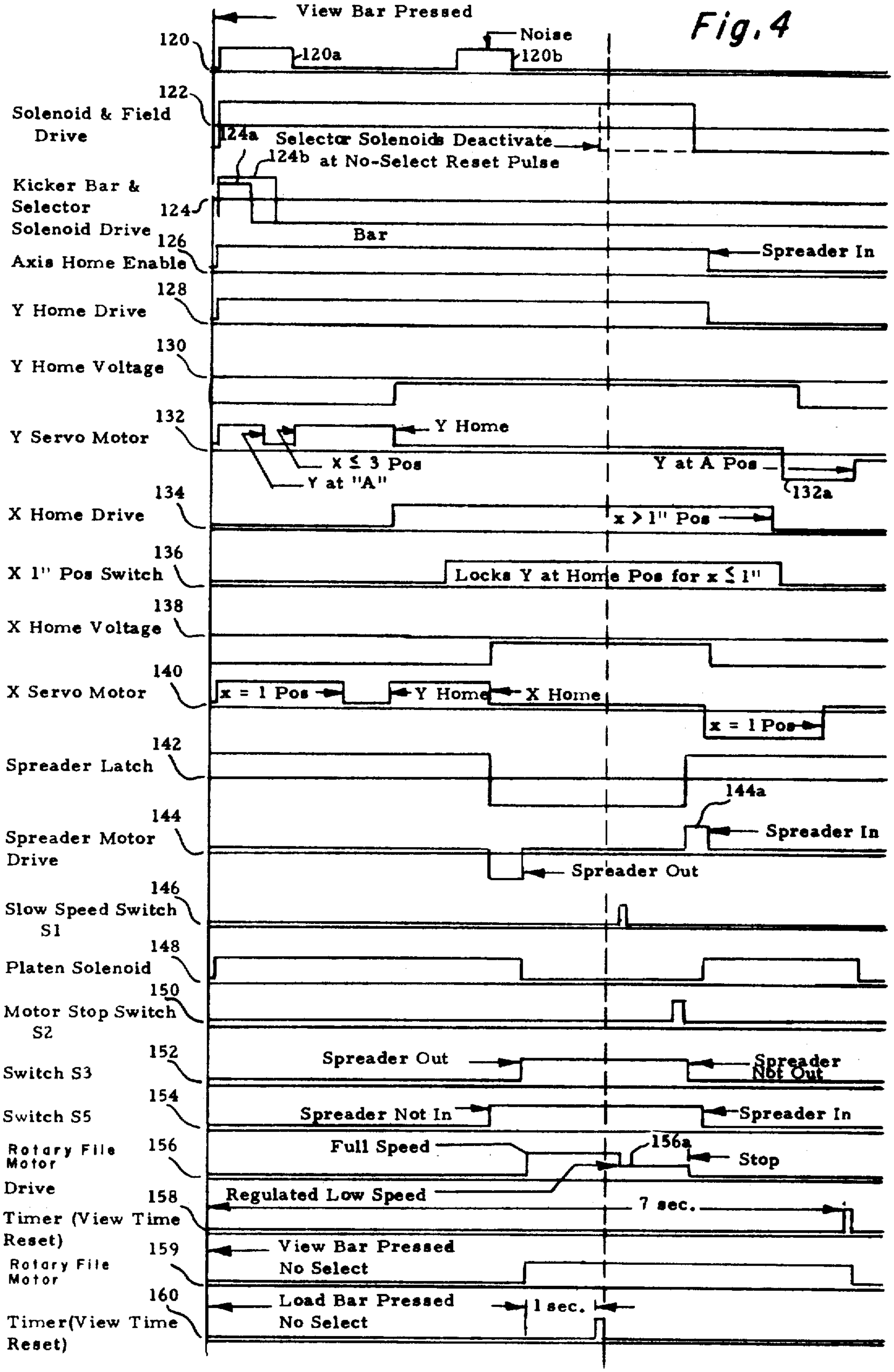
FIG. 4 depicts as a function of time the waveform of various signals of the block diagram shown in FIG. 3 generated during a view cycle.

Solenoid, Kicker Bar Drive and Field Off Delay — The function of the block 54 labeled Solenoid and Kicker Bar Drive and Field Off Delay is to control energization of the selector and kicker bar solenoids when locking type selector bars are utilized and to ensure that field drive is applied to the file motor M1 for a predetermined period of time, such as, for example, 30 milliseconds, after the file motor is stopped subsequent to selection of the desired microfische. The purpose of the Kicker Bar drive is to return any previously selected microfische to the file storage position prior to energization of the file motor M1, since otherwise any previously selected microfische (which extends a preselected distance, e.g., one-fourth of an inch, from the file housing) would be damaged as the file is rotated. A drive pulse of, for example, 120 milliseconds duration, is applied to the kicker bar solenoid. The selector bars are locked in place by the return of the kicker bar. Representative kicker bar solenoid and selector bar solenoid drive signals are depicted in FIG. 4 at 124.

Solenoid and Field Drive — In some applications it may be desired to utilize selector bar solenoids of the non-locking type. These solenoids require continuous energization to maintain the selector bars in the desired binary code. The function of the Solenoid and Field Drive circuit 56 is to provide continuous drive power to these solenoids until after the microfische is selected, or until the view cycle is terminated, and to provide field power to the file motor M1.

View Load Delay — The "view cycle initiate" signal generated by the circuit 50 and "latched" by the View Latch circuit 52 is applied to the View Load Delay 58. This circuit is operative to perform two functions. First, the circuit terminates view cycle operation of the system when no microfische is selected within a predetermined time interval. In the illustrated embodiment described herein, the circuit 58 is designed to terminate the view cycle after approximately three revolutions of the file or about 7 seconds. The second function of the delay circuit 58 is to terminate the file motor M1 after approximately one-half second of file rotation when the load bar 42 is activated. In the present example, the file 12 (FIG. 1A) rotates approximately one-half revolution during this time interval, thereby positioning the selected microfische in front of the viewing screen facilitating removal by the operator for updating, etc.

On Delay — The On Delay circuit 60 receives an input from the latch 52 signifying that a view cycle has been initiated. The On Delay circuit 60 is operative to provide a predetermined delay of, for example, 20 milliseconds during which time the field drive is applied to the file motor M1. The output of circuit 60 enables the File Motor Drive 76 which drives the file motor at maximum speed. An enable signal is also applied to the Logic circuit 95 to initiate timing of a load cycle when the load button 42 has been activated. The On Delay circuit 60 receives an input signal from the Spreader Out switch S3 which enables logic in the On Delay circuit 60 to provide power to the file motor M1. In other words, power cannot be applied to the file motor M1 until an input signal is received from both the Latch 52 and switch S3.

Axes Position Latch — The function of the Axes Position Latch 62 is to control the mode of operation of the X, Y servo mechanism to either the "home" position mode or the "display" mode. The output of the latch 52 is applied to the Axes Position Latch 62, and whenever a view cycle is initiated the output of the latch 52 indicates that the X, Y servos should operate in the home position mode. At this juncture it should be noted that before a selected microfische may be recovered from the file and displayed, any previously selected microfische positioned for display must be returned to the "home" position in the file. Thus, in response to activation of the view bar 20, indicating that it is desired to display a selected microfische, the latch 52 sets the Axes Position Latch 62 such that a "-home" signal is applied to the X, Y servo motors M2 and M3. The Axes Position Latch 62 remains set in the home mode until an input is received from the Spreader In Logic 70 indicating that the desired microfische has been selected and that the spreader 32 (FIG. 1A) has been moved into position isolating the selected microfische for retrieval. The input from the Spreader In Logic 70 changes the logic state of the Axes Position Latch 62 terminating the home signal to the X, Y servo motors M2 and M3 and enabling the X Control 88 and Y Control 80 to position the selected microfische to the index, i.e., the 1-A position, for display.

Spreader Latch — The Spreader Latch 64 functions to control operation of the Spreader Drive Circuit 66. The logic state of the Spreader Latch 64 is set responsive to inputs from the Spreader In Logic 70 and the Spreader Out Logic 68. For example, when the inputs indicate that the spreader is to be positioned from the "out" position to the "in" position, the logic state of the Spreader Latch is set so as to provide an enable signal to the Spreader Drive to drive the spreader motor M4 to position the spreader to the "in" position.

Spreader Drive — The Spreader Drive Circuitry 66 provides power to the spreader motor M4 responsive to the enable signals received from the Spreader Latch 64. When the Spreader Latch 64 is set to one logic state, the Spreader Drive 66 output is negative, and when the latch 64 is set to the opposite logic state, the Spreader Drive output is positive. The Spreader Drive output is shown at 144, FIG. 4.

Spreader Out Logic — During the time that a microfische is positioned for display, the spreader 32 remains positioned in the file. Assuming that at the initiation of a view cycle a previously selected microfische is still positioned for display, the Axes Position Latch 62 ensures that the microfische is returned to the file home position. As soon as the microfische is positioned in the file, an X Home Switch S4 provides an input to the Spreader Out Logic 68 indicating the spreader may now be withdrawn so that the file motor may be energized and the desired microfische selected. As will be explained in more detail hereinafter, the Y servo motor M3 is driven to the home position prior to driving the X servo motor M2 to the home position in order to prevent damage due to interference between the platen and the servo mechanism.

Responsive to the input from the home switch S4, the Spreader Out Logic 68 provides an enable signal to the Spreader Latch 64 changing the logic state thereof. The Spreader Latch 64 in turn provides an enable signal to the Spreader Drive 66, resulting in the Spreader 32 being driven to the "out" position.

Spreader In Logic — During a view cycle, any previously selected microfische is returned to the file, the Spreader 32 is withdrawn, and the file motor activated so that the new selected microfische may be retrieved. When the desired card is selected and the file 12 stopped, the Spreader 32 must be positioned to the "in" position to facilitate retrieval of the microfische. The Spreader In Logic 70 functions to provide an enable signal to the Spreader Latch 64, resetting the logic thereof, enabling the Spreader Drive 66 to position the Spreader 32 to the "in" position. To accomplish this function, the Spreader In Logic 70 receives an input from the File Stop circuit 74, indicating that a microfische has been selected and that the File 12 has ceased rotation. When the Spreader 32 is positioned to the "in" position, a Spreader In switch S5 is activated and is operative to provide an enable signal to the Axes Position Latch 62 to set the logic thereof to control operation of the X, Y servo motors M2 and M3 in the servo mode and to position the microfische to the 1-A index position.

Low Speed Logic— Once a microfische is selected, it is desirable to reduce the speed of the file 12 to a slow regulated speed in order to facilitate stopping the file with the selected microfische accurately positioned for retrieval by the X, Y servo mechanism 36 (FIG. 1). The function of the Low Speed Logic circuit 72 is to provide a signal to the File Motor drive 76 to effect this reduction of file speed. The Low Speed Logic circuit 72 receives an input from a Low Speed Switch S1 which is activated by the selected microfische. For example, the Low Speed Switch S1 may be mounted on the Selector 24 (FIG. 1A) such that a selected microfische activates the switch S1 as the microfische rotates past it.

File Stop— The File Stop logic 74 is arranged such that two inputs from the switch S2 are required before an output signal is generated. The first input is generated when the stop switch S2 is activated by the selected microfische as it rotates over the switch. The second input results when the stop switch S2 is released after the microfische has passed. It is preferred that this logic arrangement be utilized since it is difficult to have precise positioning information from activation of the stop switch S2. On the other hand, very precise positioning may be obtained from the signal generated by deactivation of the stop switch. The output of the File Stop logic 74 is applied to the Spreader In Logic 70 to reset the status thereof to enable the Spreader 32 to be positioned into the File 12. An output signal is also provided to the File Motor Drive 76 via the View Load Delay 58, the reset line 59, the View Latch 52 and the On Delay 60 to initiate logic in the File Motor Drive 76 operable to effect application of dynamic braking to terminate file rotation in a position such that the selected microfische may be retrieved.

File Motor Drive— The purpose of the File Motor Drive 76 is to control operation of the file motor M1 responsive to the logic state of the On Delay circuit 60. One logic state of the On Delay 60 controls the File Motor Drive circuit 76 such that the File 12 rotates at maximum speed. This ensures that the desired microfische will be selected in the minimum time. Once the microfische is selected it activates the Low Speed Switch S1 providing an indication that the file is to be operated in a regulated slow speed mode. Responsive to the file stop signal from switch S2, the output from both the On Delay 60 and the Low Speed logic 72 are removed. This is accomplished by the File Stop circuit 74 providing a signal to the View Load Delay 58 terminating the timing cycle, signifying that a microfische has been selected. The View Load circuit 58 then provides a reset signal to the View Latch 52 changing the logic state thereof which in turn provides a logic signal to the On Delay circuit 60 removing the output therefrom to the File Motor Drive 76. At this juncture the File Motor Drive logic 76 assumes an integration mode during which time the speed of file rotation is sensed. The File Motor Drive 76 controls application of dynamic braking so that the file is stopped in a predetermined position such that the selected microfische is aligned for retrieval by the X, Y servo mechanism.

Safety Switch — During normal operation (servo mode), the X and Y servos are positioned such that no interference with the platen 38 can occur. However, to prevent the Y servo mechanism from interfering with the platen 38 when the X and Y servos are near the home position, it is desirable to lock the Y servo in the home position whenever the X servo is within a preselected distance, such as, for example, 1 inch from the home position. Thus, when the X and Y servo mechanism retrieves a microfische from the file home position, the Y servo drive is prevented from being applied until the X servo has been driven to a position X>1 inch. Similarly when a microfische is returned to the home position, the Y servo must be returned to the home axis prior to the X servo being positioned to a location closer than 1 inch. Control of the X and Y servos to accomplish this function is provided by the Safety Switch circuit 78. The output of this circuit is applied to the Y Control Circuit 80. The Safety Switch circuit 78 receives enabling logic inputs from the Axes Position Latch 62, the X>1 inch switch S6, and the X<3 Position circuit 86. The Axes Position Latch input functions to control whether the X and Y servos are to be positioned toward the home position or toward the display position. As will be explained in more detail with reference to the discussion of the X<3 Position circuit 86, the Y servo "home position" drive must not be applied until after X is less than position 3. When X is less than position 3, an input is applied to the Safety Switch 78 enabling the Y home drive 82 to be applied. It is imperative, however, that the X servo not be positioned to the home position until Y is home. The X>1 inch switch S6 controls the logic of the Safety Switch 78 to prevent the X servo from being positioned any closer to the home position than 1 inch until the Y bottom switch S7 indicates that the Y servo is home.

Y Control — The output of the Safety Switch 78 is applied to the Y control circuit 80. Responsive to the state of this output, the Y servo mechanism is set to operate in either the servo mode or the home position mode. When the servo mode of operation is indicated, an input is provided to the Y servo from the key bank 18 (FIG. 1) thereby providing to the Y servo motor M3 a voltage proportional to the Y coordinate display position desired. It is to be recalled that when a microfische is initially selected, a signal is automatically applied to drive the X, Y servos from the home position to a preselected index position such as X=1, Y=A. The frame of microfilm at this position is displayed and an index of the contents of the other 97 microfilm positions on the microfische is provided. The operator may select the microfilm frame he wishes to have displayed and enter this information to the system by way of, for example, keyboard 18 to provide an analog signal to the X, Y servo motors.

When the output of the Safety Switch 78 provides a signal to the Y Control Circuit indicating that the home position mode of operation is desired, the logic is arranged so as to apply a home voltage of, for example, —20 volts, to the Y servo motor M3 to rapidly drive the Y servo to the home position. A Y home position switch S7 provides an input to the Y Control Circuit 80 when the Y servo has reached home, thereby terminating the Y home drive. The Y Control Circuit 80 also provides a signal to the Platen Solenoid Control circuit 96 in order to ensure that the platen solenoid is not energized during movement of the Y servo, thereby preventing damage to the microfische.

Y Drive — The Y Drive Circuit 82 amplifies the outputs from the Y Control Circuit 80 to servo motor levels. The output of the Y Drive Circuit 82 is applied directly to the Y servo motor M3.

X In Logic — The X In Logic circuit 84 functions to prevent the X servo from going to the home position until the Y servo has been positioned home. This is to ensure that the platen is not damaged by the X, Y servo mechanisms. There are two enable signals that form inputs to the X In Logic 84. The first signal is from the Axes Position Latch 62. As explained previously, the Axes Position Latch has two logic states, one state ensuring operation of the X, Y servos in the servo mode and the other logic state ensuring operation of the X, Y servos in the home position mode. When the home position mode of operation is desired, the Axes Latch 62 provides a signal to the X in circuit 84 setting the logic therein to a predetermined state. This logic is ANDed with the second input which is from the Y home position switch S7. The output of the ANDed logic signal is an enable signal to the X Control circuit 88, enabling X home drive voltage to be applied to the X servo motor M2.

X<3 Position — The function of the X<3 Position circuit 86 is to ensure that the selected microfische is not damaged by the lip of the file 12. This function is accomplished by preventing the Y servo from going to the home position; that is, the Y servo is controlled to go no further toward the home position than position A, until the X servo is less than a predetermined distance from the file that provides sufficient clearance, such as, for example, position 3. The X<3 Position circuit 86 receives a signal from the X Control circuit 88 indicating when the X servo is positioned at a location less than 3. When this occurs, an output signal is applied to the Safety Switch 78 which in turn enables the Y Control 80 to position the Y servo to the home position.

X Control — The purpose of the X Control circuit 88 is to provide proper enable signals to the X Drive 90, responsive to inputs from the X In Logic 84. In one logic state, the X In Logic circuit 84 sets logic in the X Control circuit 88 such that the X servo operates in the display, that is, servo mode. In this case, the X Control circuit 88 takes an input from the keyboard 18 (FIG. 1) to determine the desired X coordinate location. A second logic state of the X In Logic 84 sets logic in the X Control circuit 88 to enable operation of the X servo in the home position mode. The X Control logic 88 is arranged such that the X servo home drive is enabled until the X servo is driven to the X>1 inch position at which time the X home drive is terminated by operation of the Safety Switch 78 unless the Y servo is already in the home position.

A signal from the X Control circuit 88 is also applied to the Platen Solenoid Control 96 to ensure that the platen solenoid does not damage the microfische when the X servo motor M2 is in operation.

X Drive — Responsive to outputs from the X Control circuit 88, the X Drive 90 provides power to the X servo motor M2. When the servo mode of operation is desired, the drive signal is a function of the X coordinate display location selected. For example, a conventional linear resistor arrangement may be utilized and a voltage difference generated to drive the servo motor M2. When in the home position mode of operation, a continuous power supply voltage is utilized to rapidly drive the X servo to the home position.

Load One Shot — The load button 42 is utilized whenever the operator wishes to physically remove a selected microfische from the file storage 12 so that the microfische can be updated or replaced. To facilitate removal of the microfische, the load operation functions to locate the desired microfische away from the platen 38. The Load One Shot 92, the Load Latch 94, the Load Logic 95, and the View Load Delay 58 operate to accomplish this load function.

Responsive to activation of the load button 42, the Load One Shot 92 provides an enable pulse to the Load Latch 94. As shown by the OR Gate 43, whenever the load button 42 is activated, the View One Shot 50 and associated circuits are also activated.

Load Latch — The Load Latch 94 is set to a predetermined logic state in response to an input from the Load One Shot circuit 92. The Load Latch remains in this logic state, providing an enable signal to the Load Logic circuit 95 until the load latch is reset by the master reset line 59, from the View Load Delay 58 or Power On Clear circuit 98.

Load Logic — The Load Logic circuit 95 receives enable inputs from the Load Latch 94 and from the On Delay 60. The load latch input signifies a load operation is desired and the on delay output signifies that file motor operation is ready to begin; that is, any previously selected microfische has been returned to the file and file motor field has been initiated. When signals from both the Load Latch 94 and On Delay 60 are present, the Load Logic 95 provides an output to the View Load Delay 58 which automatically terminates file motor operation after a predetermined time interval such that the selected microfische is positioned for easy access.

To effect a load operation, the code of the desired microfische is entered via a keyboard 22 (FIG. 1). The view button 20 is then activated to effect selection of the desired microfische. Next, the load button 42 is activated and the microfische correctly positioned for the loading operation.

Platen Solenoid Control — The purpose of the Platen Solenoid Control circuit 96 is to position the microfische close to the lens for good focus and viewing qualities during display. However, during those times when the microfische is changing position as a result of either the X or Y servo motors being activated, damage could occur to the microfische by scratching or rubbing unless the microfische is moved away from the lens. The Platen Solenoid Control circuit 96 receives inputs from both the X Control circuit 88 and the Y Control circuit 80 to ensure that the microfische is positioned away from the lens when either servo motor or both are activated.

Power Supply — The Power Supply 97 operates off of a plus and minus volt supply and functions to supply full wave rectified unfiltered plus and minus 12 ½ volts for the servo control circuits, plus and minus 14 volts for the servo motors, plus and minus 20 volts for various control functions, and plus 5 volts d.c. for all logic.

Power On Clear — The Power On Clear circuit 98 provides a reset pulse to the View Latch 52 and the Load Latch 94 whenever the display system is initially turned on to insure that a view cycle may properly be initiated.

MODE OF OPERATION

With reference now to FIGS. 1, 3, and 4, operation of the system will be described through a complete view cycle that includes returning any previously selected microfische to the home, that is, storage position in the file, locating the desired microfische from the file storage, and positioning it for viewing. The cycle is initiated by activating the view bar 20 on the display keyboard 18. It is assumed that the code or identity of the desired microfische has already been entered by the user via the "select" keyboard 22. When the view bar is activated, an enable pulse **120*a* is thereby generated. This pulse is applied to the View One Shot 50 and thus initiates a view cycle that continues until the selected microfische is positioned for viewing or, if no microfische is selected, for a predetermined period of time, for example, 7 seconds, after which time the view cycle is automatically terminated by a timing circuit in the View Load Delay 58. Once a view cycle is initiated, it is completed regardless of whether the view bar 20 is again depressed during the cycle period. If the view bar 20 is inadvertently depressed after a view cycle has begun, the pulse 120*b* thereby produced is prevented from triggering the View One Shot 50 by an inhibit signal applied to the View One Shot from the View Latch 52. Therefore, pulse 120b is descriptively labeled "noise". The inhibit signal to the View One Shot 50 is removed when the View Latch 52 is reset by a signal from the View Load Delay 58**.

Several signals are simultaneously produced in response to the enable pulse **120*a*. The solenoid and field drive signal 122 is applied to the selector bar solenoids of the selector section 24 and to the field of the file motor M1. The field drive is continuously applied until after a predetermined delay subsequent to termination of the file motor drive 76**. The drive applied to the selector bar solenoids positions the bars so that they effect a binary code corresponding to the code of the desired microfische.

Waveform 124 is also initiated by pulse **120*a* and depicts at 124*a* the drive applied to the solenoid of the kicker bar 30. An alternate selector bar solenoid drive is shown at 124*b* for the embodiment wherein locking type selector bars are utilized. In this alternate embodiment, the kicker bar 30 functions to lock in place the selector bars positioned by energization of the corresponding solenoids. That is, when the kicker bar is released by termination of the kicker bar drive 124*a*, the selector bars are thereby locked in place. Subsequently the selector solenoid current 124*b* is terminated. With reference to waveform 124, the kicker bar drive 124*a* may be applied for a duration of 120 milliseconds, for example, and the selector solenoid drive 124*b*** terminated 30 milliseconds thereafter.

An axes home enable signal is shown at 126. This signal is also initiated when the view bar 20 is activated and is continuously applied to the Axes Position Latch 62, setting the logic thereof to a state that controls the X and Y solenoids such that they are driven to the home position. The axes home enable signal is applied until the spreader 32 has been positioned to the "in" position indicating that the desired microfische has been selected and is ready for display in the index (1-A) location. The axes home enable signal 126 enables the Y home drive 128, the Y servo motor drive 132, and the X servo motor drive 140. It should be noted at this juncture that the Y home voltage 130 is controlled by a switch S7 that is operable to supply a negative voltage, −20V, for example, whenever the Y servo is not in the home position.

The platen solenoid drive 148 is also initiated when the view bar is pressed and is operative to position the microfische away from the platen structure so that when the X and Y servo motors move the microfische toward the home position the microfilm is not scratched or damaged. The platen solenoid drive 148 is terminated when both the X and Y servos are in the home position.

In summary, a view cycle is initiated by activating the view bar 20 which provides an enable signal 120 that in turn enables generation of the solenoid and field drive 122, the kicker bar and selector solenoid drive 124, the axes home enable 126, the Y home drive 128, the Y servo motor drive 132, the X servo motor drive 140 and the platen solenoid drive 148. These signals are operative to set the selector section 24 to correspond to the desired microfische and initiate return of any previously selected microfische to the home position prior to searching for the newly selected microfische.

When a view cycle is initiated, the Y servo motor M3 receives a drive signal that continues until the Y coordinate axes is located at position A. To prevent damage to the microfische, the Y axes is prevented from being positioned to the home position (shown diagrammatically in FIG. 2 at H) until the X axes is at a position less than or equal to three. Therefore, the Y servo motor drive 132 is terminated when the Y axis reaches the A position and then resumes when the X axes is at the 3 position and continues until the Y axis is home, at which time the Y servo drive 132 is terminated. The Y servo drive remains at the zero level until later in the view cycle when a microfische has been selected for display and is ready to be positioned to the index location 1-A and the X axis has been positioned to a location that is one inch or more away from the home position, at which time the Y servo motor M3 receives a drive of opposite polarity to drive the Y axis away from the home position to the A location.

When a view cycle is initiated, the X servo motor M2 also receives a drive signal 140 operative to drive the X axis toward the home position. The drive 140 continues until the X axis is at the 1 (index) position. To prevent damage to the microfische, the X axis is prevented from being driven to the home position until after the Y axis is home. Thus, drive 140 goes to zero when the X axis is at the one position and does not resume until a signal is received from the Y home position switch S7 indicating that the Y axis is home.

The switch S7 enables the X home drive 134 and terminates the Y home voltage 130. When the X servo motor M2 has positioned the X axis to a location X=1 inch or less (a location intermediate the coordinate position X=1 and the home position) a switch S6 provides an enable signal 136 that locks the Y axis at the home location thereby insuring that damage to the microfische does not occur due to interference between the Y servo structure and the platen 38.

When the X axis is positioned to the home location, a switch S4 provides a signal that changes the Spreader Latch logic 64 (via the Spreader Out Logic 68) such that the spreader latch output 142 reverses polarity. This in turn enables the spreader motor drive 144 which is operative to withdraw the Spreader 32 from the file storage 12. A switch S8 terminates the drive voltage when the spreader is positioned to the "out" position. The platen solenoid drive 148 is also terminated at this time. As soon as the spreader 32 is moved from the "in" position a switch S5 provides a signal 154 to the Spreader In Logic 70, setting the logic state thereof. This signal is maintained until the desired microfische is subsequently selected and the spreader 32 again inserted into the file storage.

When the spreader 32 has been positioned to the "out" position (thus clearing the file so that it may be rotated) a switch S3 provides a signal 152 that sets logic in the On Delay circuit 60 which enables application of the file motor drive 156 to drive the file motor at full speed.

Recapping, a view cycle is initiated by signal 120. Responsive to this signal the file motor field is energized and the selector bars are positioned to correspond to the code of the desired microfische. Any previously selected microfische are returned to the home, i.e., file storage, position, responsive to the axes home enable signal 126. The sequence of return of the microfische is controlled to prevent damage to the microfilm and platen. The spreader is withdrawn, leaving the file free to rotate, and a file motor drive enable signal is applied to the file motor control logic.

The File Motor Drive 156 is applied and is operative to power the file motor M1 at full speed so that the desired microfische may be selected in the minimum time. The microfische corresponding to the code effected by the selector bars is pulled away from the file storage a distance of, for example, about one-fourth of an inch. The selector microfische activates a slow speed switch S1 which provides a signal 146. This signal activates logic circuitry in the Low Speed Logic 72 and functions to switch the file motor from full speed operation to a regulated low speed operation, as shown by the reduced motor drive in the region **156*a*. The microfische continues to be rotated by the file motor until it activates a switch S2 which provides a motor stop signal 150. This signal is operative to remove enable signals from the On Delay circuit 60 and thereby effects dynamic braking of the file motor M1 so as to stop the file 12 in a position where the selected microfische can be removed from the file 12 by the retrieval mechanism 36. The motor stop signal 150 also enables the Spreader Latch logic 64 such that the latch output 142 is switched to the "in" state. This provides a spreader motor drive 144*a* that drives the spreader 32 toward the file 12, isolating the selected microfische from other microfische in the storage. When the spreader 32 is at the "in" position, switch S9 terminates the spreader motor drive 144*a*. The motor stop signal 150 is also applied to the View Load Delay 58 and is operative to reset the logic of the View Latch 52 and the Load Latch 94** and thereby enable initiation of a new view cycle.

Once the spreader 32 is positioned into the file storage, a signal is applied to the X servo motor M2 to drive the X axis to the index or 1 position. Switch S6 detects when the X axis is greater than 1 inch from the home position and terminates locking signal 136 and enables application of Y servo motor drive **132*a* which drives the Y servo to the index position A. Thus, the selected microfische is automatically positioned to the index position 1-A and the index frame of microfilm is displayed. From the index page the operator may select a coordinate position; that is, a microfilm frame containing the information he desires. This information is entered into the keyboard 18 which applies X and Y servo drives which are proportional to the coordinate location of the desired frame. The view bar 20** is again depressed and the X, Y servo motors are driven to position the selected frame of microfilm for display.

In the event that no microfische is selected during a preselected time of file rotation, such as, for example, 7 seconds, a view time reset signal 158 is applied. This signal is operative to terminate the file motor drive as shown at 159. Similarly, responsive to activation of the load bar 42 absent a microfische selection, a reset signal 160 is applied after, for example, one second elapsed time to terminate the File Motor Drive 159.

Circuit Description — With reference to FIGS. 5-14, there is schematically depicted logic and drive circuitry that may be utilized to accomplish the functions illustrated in FIG. 3. For convenience in referencing between the block diagrams and the schematic circuits, each functional block includes a reference to a figure where the corresponding schematic diagram is depicted. Further, each schematic has the corresponding function enclosed in dashed lines. For example, the View One Shot functional block 50 (FIG. 3) has a cross reference to FIG. 5. Referencing FIG. 5, the schematic elements required to effect the View One Shot function are enclosed by dashed lines labeled 50.

Figure 5:
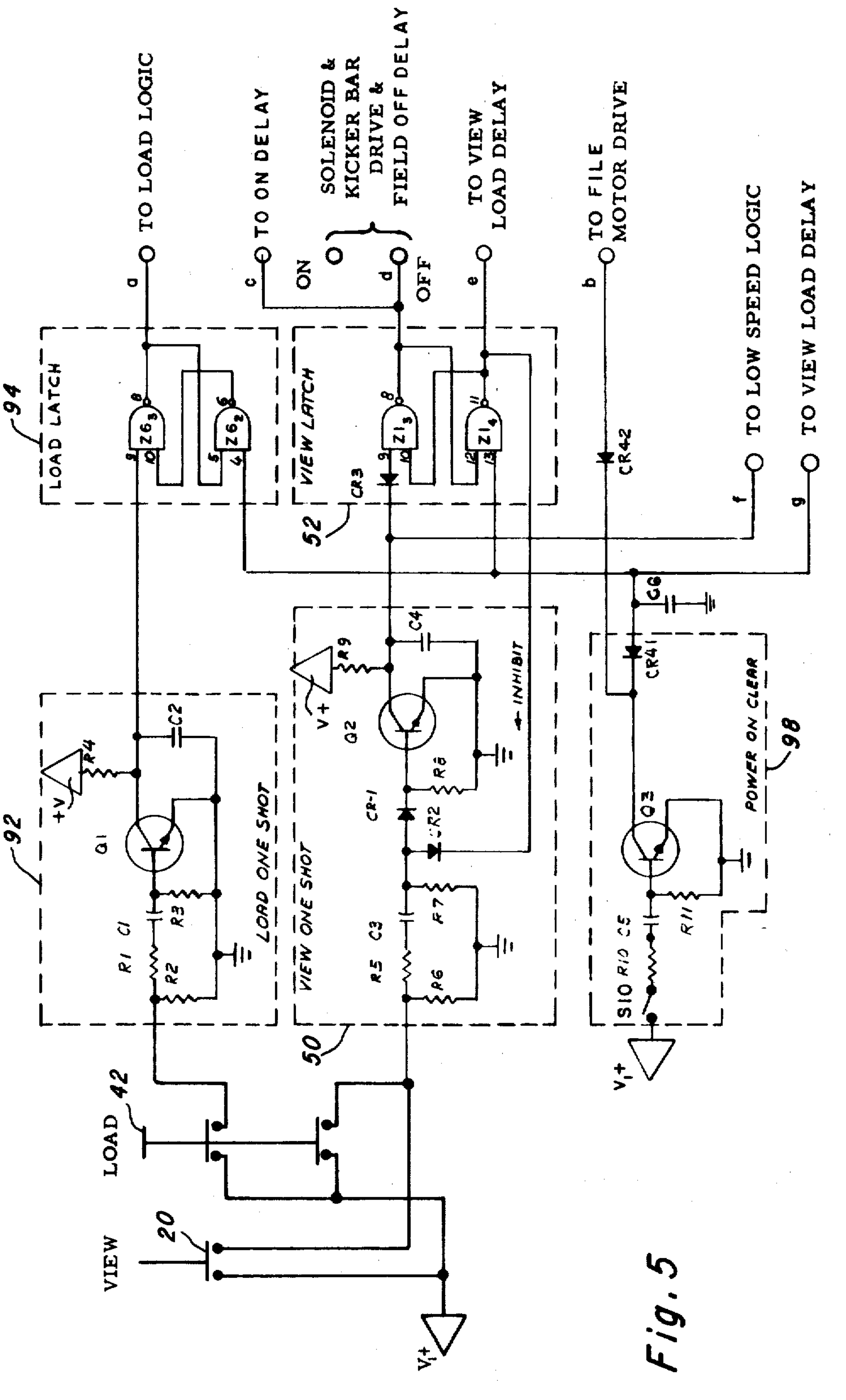
FIGS. 5–14 schematically depict logic and drive circuitry that may be utilized to accomplish the functions of the block diagram in FIG. 3.

With reference now specifically to FIG. 5, there is schematically depicted logic and electrical circuitry that may be utilized for the Load One Shot 92, the Load Latch 94, the View One Shot 50, the View Latch 52, and the Power On Clear 98.

Load One Shot — The Load One Shot circuit 92 comprises an npn transistor Q1, resistors R1–R4, and capacitors C1 and C2. A signal from the load bar 42 is coupled to the base of transistor Q1 through the series RC Circuit R1 and C1 and biasing resistors R2 and R3. The collector of transistor Q1 is biased by a V+ power supply applied through resistor R4. When transistor Q1 is switched on by the input from the load button 42, capacitor C2 discharges providing a one shot pulse output to the Load Latch circuit 94.

Load Latch — The Load Latch circuit 94 comprises a pair of NAND gates $Z6_2$ and $Z6_3$. The output of the Load Latch circuit is taken from pin 8 of NAND gate $Z6_3$. The logic state of this output is normally set by either the Power On Clear circuit 98 or the View Load Delay circuit 58 providing a reset pulse to pin 4 of NAND gate $Z6_2$. Whenever a load function is desired, the load bar is depressed producing a one shot pulse at pin 9 of NAND gate $Z6_3$. This pulse changes the logic state of the output from the Load Latch circuit 94 and provides an enable signal to the Load Logic circuit 95.

View One Shot — The View One Shot circuit 50 comprises an npn transistor Q2, resistors R5-R9, capacitors C3 and C4 and diodes CR1 and CR2. An input is applied to the view one shot circuit whenever the View Button 20 or the Load Button 42 is depressed. This signal is coupled through the RC circuit R5 and C3, which is biased to ground through resistors R6 and R7, through diodes CR1 to the base of transistor Q2. The collector of transistor Q2 is biased from a V+ power supply connected through resistor R9. When transistor Q2 is biased on by application of a signal from either the View Button 20 or the Load Button 42, capacitor C4 discharges providing a negative pulse through diode CR3 to pin 9 of the NAND gate $Z1_3$ of the View Latch circuit 52.

View Latch — The View Latch circuit 52 comprises two NAND gates $Z1_3$ and $Z1_4$. The output of the View One Shot circuit 50 is applied to NAND gate $Z1_3$ and thereby sets the View Latch 52 in one logic state. The output of the View Latch circuit is taken from pin 8 of NAND gate $Z1_3$ and is operative to provide an enabling signal to the On Delay circuit 60 and to the Solenoid and Kicker Bar Drive and Field Off Delay circuit 54. Pin 8 of NAND gate $Z1_3$ is also interconnected to pin 12 of NAND gate $Z1_4$, setting the output of that NAND gate. The output of NAND gate $Z1_4$ is taken from pin 11 and is connected to the View One Shot circuit 50 and operates to inhibit the biasing of transistor Q2 until the View Latch 52 has been reset by an input applied to pin 13 of NAND gate $Z1_4$ from either the View Load Delay circuit 58 or the Power On Clear circuit 98.

Power On Clear — The Power On Clear circuit 98 comprises a common emitter npn transistor Q3, resistors R10 and R11, capacitors C5 and C6, and diodes CR41. A $V_1+$ power supply is connected through an on/off switch S10 through an RC biasing arrangement of R10, C5, and R11 to the transistor Q3. A negative pulse is provided by capacitor C6 and is applied to the View Latch circuit 52 and is operable to set the logic of the view latch to enable it to receive the view one shot signal. The collector of transistor Q3 is connected to the File Motor Drive circuitry 76 through diode CR42.

Figure 6:
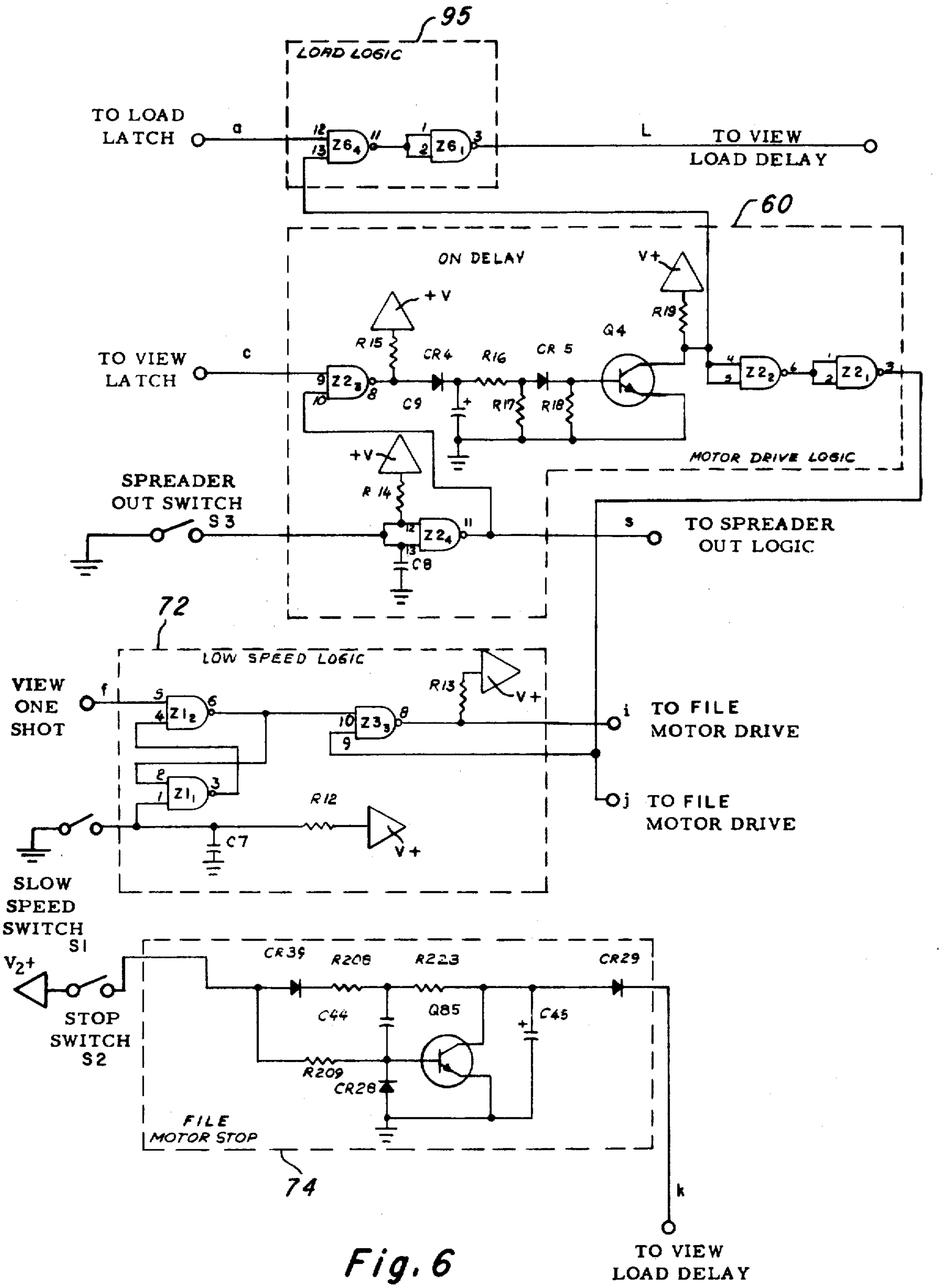

With reference now to FIG. 6, there is depicted electrical and logic circuitry that may be utilized for the Load Logic 95, the On Delay 60, the Low Speed Logic 72, and the File Stop 74.

Load Logic — The Load Logic circuitry 95 comprises two cascaded NAND gates $Z6_4$ and $Z6_1$. The output of the Load Latch circuit 94 is applied to input pin 12 of NAND gate $Z6_4$. The second input to the NAND gate $Z6_4$ is obtained when transistor Q4 of the On Delay circuit 60 is biased to the conducting state. The output of the Load Logic circuit 95 is taken from pin 31 of NAND gate $Z6_1$ and is applied to the View Load Delay circuit 58.

On Delay — The On Delay circuit 60 comprises NAND gates $Z2_1$, $Z2_2$, $Z2_3$, and $Z2_4$, npn transistor Q4, resistors R14-R19, capacitors C8 and C9, and diodes CR4 and CR5. Inputs to the On Delay circuit are applied to pin 9 of NAND gate $Z2_3$ from the View Latch circuit 52 and to pins 12 and 13 of NAND gate $Z2_4$ from the spreader out switch S3. The NAND gate $Z2_3$ provides an output at pin 8 responsive to activation of the spreader out switch S3 and application of a pulse from the View Latch circuit 52 responsive to activation of the view bar 20. An RC circuit C9, R16, and R17 provides a preselected delay to the signal produced at the output of pin 8 of NAND gate $Z2_3$ prior to biasing on transistor Q4. This delay is required in order to afford time for the file motor field drive to be applied. NAND gates $Z2_1$ and $Z2_2$ are cascaded and operate to provide the motor drive logic for controlling the speed of the file motor. The output at pin 14 of NAND gate $Z2_4$ is also applied to the Spreader Out Logic circuit 68.

Low Speed Logic — The Low Speed Logic circuit 72 comprises NAND gates $Z1_1$, $Z1_2$, and $Z3_3$, resistors R12 and R13, and capacitor C7. NAND gates $Z1_2$ and $Z1_1$ are interconnected to form a latch that is set to an enable logic state upon application of a pulse from the View One Shot circuit 50 to pin 5 of NAND gate $Z1_2$ and application of a pulse from the slow speed switch S1 to pin 1 of NAND gate $Z1_1$. The output of the latch is taken from pin 6 and is applied as one input of NAND gate $Z3_3$. A second input to NAND gate $Z3_3$ is applied to pin 9 from the output of NAND gate $Z2_1$ of the On Delay circuit 60. When both signals are present at inputs 9 and 10 of NAND gate $Z3_3$, the logic state of the output pin 8 is set and is applied to the file motor drive to effect slow speed operation of the file motor M1.

File Stop — The File Stop 74 comprises npn transistor Q85, interconnected with resistors R208 and R223, capacitors C44 and C45, and diodes CR28, CR29 and CR39. An input to the base of transistor Q85 is supplied by stop switch S2. When Q85 is biased to the conducting state, capacitor C45 discharges providing a pulse to the View Load Delay circuit 58.

Figure 7:
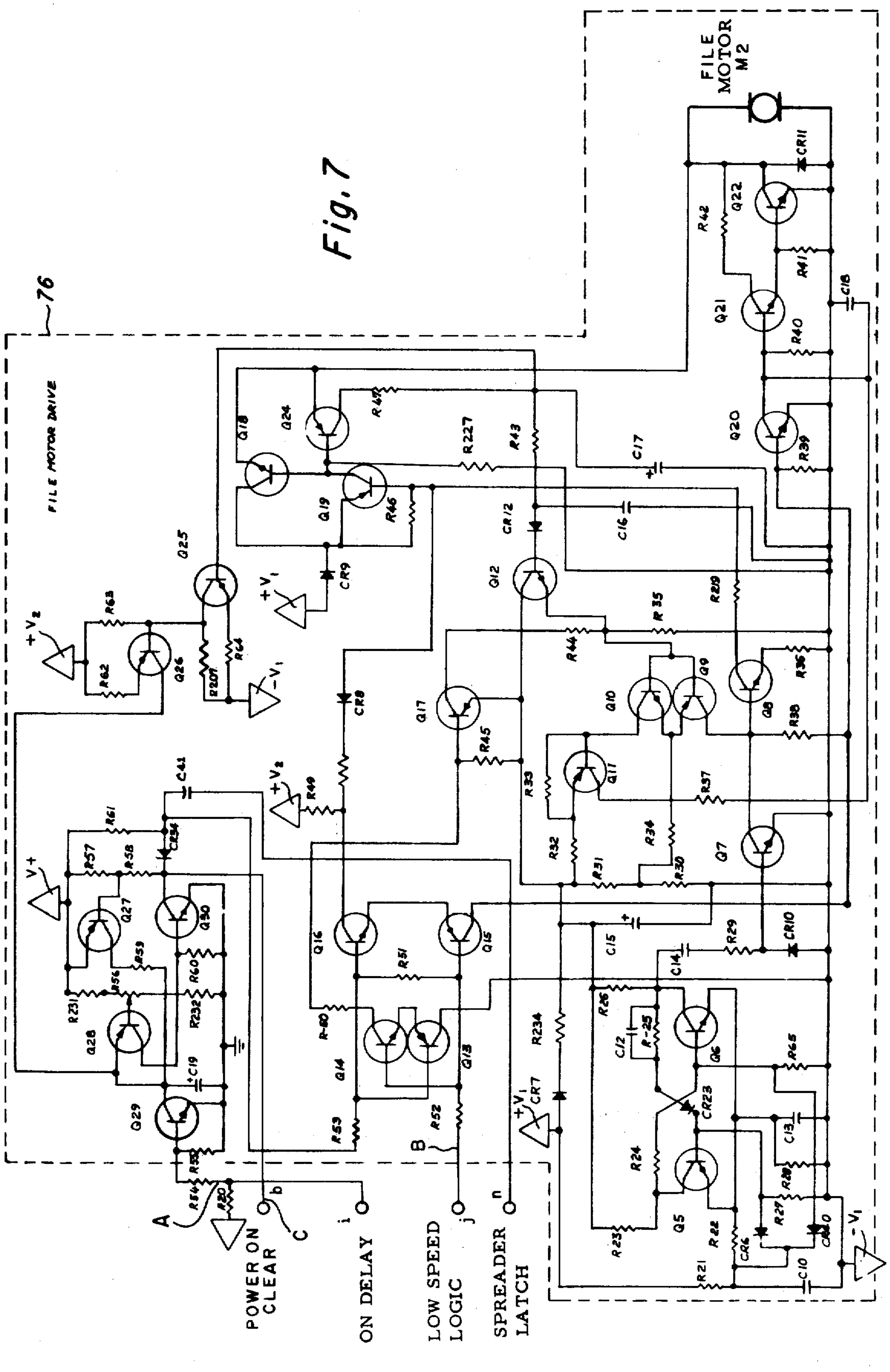

File Motor Drive — With reference to FIG. 7, there is depicted logic and electrical circuitry that may be used for the File Motor Drive 76. This circuitry includes transistors Q5-22 and Q24-30, resistors R20-65, R207, R219, R227, R231, R232 and R234, capacitors C10, C12-19, C41 and diodes CR6-12, CR23, CR34 and CR40. Inputs are provided to the File Motor Drive 76 from the Power On Clear circuit 98, the On Delay circuit 60, the Low Speed Logic circuit 72, and the Spreader Latch circuit 64.

The File Motor Drive circuit may be separated generally into four functions or modes of operation: (1) full speed, (2) regulated low speed, (3) regulated low speed delay, and (4) stop. Inputs at terminals A and B control the mode of operation as follows:

When input A is at logic 1 and input B is at logic 0, maximum drive power is applied to the motor M1. When both inputs are at logic 1, the motor is controlled to operate at a regulated low speed. When input A goes to logic 0, and input B remains at logic 1, the circuit operates in the delay mode and measures a predetermined distance of motor rotation, after which the circuit operates in the stop mode.

When input A is a 1 and input B is a 0, maximum drive power is applied by the drive circuitry. The positive input at A is conducted through resistor R54 to the base of npn transistor Q29. This saturates Q29 reducing the voltage across capacitor C19 to a value at or near ground potential, thus biasing pnp transistor Q28 off, which in turn biases npn transistor Q30 off effecting a DC voltage (+V) or logic 1 at the collector of Q30 and the junction of resistor R61 and diode CR34. The positive voltage of logic 1 at the collector of Q30 is conducted through resistor R53 to the base of npn transistor Q16. In addition, a signal is provided at the output C to indicate that the DC motor M1 is receiving drive power. Since input A is more positive than input B, and since resistors R53, R52 and R51, transistors Q16, Q15, Q13 and Q14 operate as a DC isolator, Q15 and Q16 will turn on providing drive through resistor R48 and diode CR8 to the base of pnp transistor Q19 and npn transistor Q18. This drive saturates transistor Q18 and provides maximum $+V_1$ drive to the DC motor M1. For a more detailed description of the DC isolator, reference copending application Ser. No. 103,965, entitled "DC Isolator Circuit", filed concurrently herewith and assigned to the same assignee. At each cycle of the plus and minus power supplies, $+V_1$ and $-V_1$, PNP transistor Q24 will saturate through the action of resistor R227 which is connected to the minus power supply. This causes a voltage proportional to the motor speed to be stored in capacitors C17 and C16.

When input B also goes to a logic 1, a regulated slow speed mode of operation results. The bases of transistors Q15 and Q16 assume similar potentials and, as a consequence, turn off, thereby removing maximum drive from the motor. At the next cycle of drive power, NPN transistor Q12, which is connected in an emitter-follower configuration, couples the voltage of capacitor C16 (which represents actual motor speed) to the junction of resistors R44 and R35 and also to the base of NPN transistor Q10 and pnp transistor Q9. Resistors R31 and R30 provide a voltage potential which represents the desired regulated low speed. This potential is monitored when the plus power supply and the minus power supply are at maximum voltage. When the desired low speed voltage potential is generated, it is compared with the voltage potential at the junction of resistors R44 and R35 to determine whether actual motor speed is greater than, less than, or equal to the desired regulated low speed. Assume that the actual motor speed is greater than the desired regulated low speed. This will cause transistor Q10 to turn on (since the base-emitter is forward biased) providing drive to the base of PNP transistor Q11. Thus, transistor Q11 is biased on and provides drive to the base of NPN transistors Q21 and Q22 through resistor R37. This effects maximum braking using the dynamic characteristics of the DC shunt field motor M1. This process is repeated during subsequent cycles of the plus and minus power supply until such time as the voltage reflected at the juncture of resistors R44 and R35 is similar to the voltage reflected at the juncture of resistors R31 and R30, indicating that the motor speed is at the desired value. Subsequent reduction in the motor speed braking, to load, braking etc. will cause the potential at the junction of R44 and R35 to be lower than the potential at resistors R30 and R31. When this occurs, the positive potential as seen at the juncture of R31 and R30 will be conducted through resistor R34 to the base of PNP transistor Q9. The potential at the base of Q9 will turn on and provide drive for NPN transistor Q8 which will in turn provide drive through resistor R219 to PNP transistor Q19. This drive will be proportional to the difference between the actual speed and desired motor speed. As a consequence, when the motor speed falls below the desired speed, motor drive will occur. Throughout the operation of the motor speed regulator, when the positive power supply goes to 0, transistor Q24 saturates supplying the voltage generated by the motor to capacitors C17 and C16 such that these two capacitors always maintain a representation of the actual motor speed. As may be seen, regardless of the mechanical resistance of the load being driven by the motor, the speed of the motor is accurately regulated.

A logic zero at input A is coupled through resistor R54 to the base of Q29 to initiate a programmed stop of the motor at a precise location. The logic zero biases Q29 to the off condition. The voltage representative of actual motor speed, as seen on capacitor C17, is applied to the base of npn transistor Q25. Transistor Q25 and resistor R64 provide a voltage to current convertor. Increases in the voltage on the base of Q25 provide increases in the voltage on the emitter and, consequently, an increase in current through R64. Since emitter current is approximately equal to collector current, the current through the collector is a function of the voltage on the base. Resistor R207 provides an increase in the collector current as a function of an increase in the power supply voltage, effecting a slightly higher representation of motor speed for higher power supply values. Transistor Q26 and resistors R62 and R63 provide an additional current to voltage conversion stage. Resistor R63 converts the current from transistor Q25 to a voltage and resistor R62 converts this voltage back to a current. The reason for using this subsequent stage is to amplify the voltage and current levels for more effective operation with transistor Q29, capacitor C29 and transistor Q28. The current from transistor Q26 is applied to capacitor C19 so that the voltage on C19 is the integral of the current. Since current is proportional to motor speed, the voltage on C19 is proportional to the integral of motor speed or, in other words, distance of motor rotation. After a predetermined delay or motor rotation, the voltage at C19 increases to a value larger than the voltage at the wiper of potentiometer R56, biasing transistor Q28 on and subsequently turning on NPN transistor Q30. As Q30 turns on, a logic 0 will be seen at resistor R53. Assuming a logic 1 is still reflected at input B, transistors Q13 and Q14 will saturate. This will provide drive through resistor R50 to pnp transistor Q17. This will saturate transistor Q17 which will simultaneously provide drive for transistors Q10 and Q11. This is accomplished by the collector of Q17 supplying drive through resistor R44 to the base of Q10 and the emitter of Q17 supplying drive through resistor R32 to the base of Q11. Transistor Q11 is saturated and provides drive through resistor R37 to npn transistor Q21 and therefrom to transistor Q22. This will provide maximum braking of the motor and an immediate stop.

The operation of npn transistor Q20 is to prevent any possibility of dynamic braking during full speed operation. During full speed operation, transistors Q15 and Q16 are saturated. This enables transistor Q20 to become saturated and thereby prevents any input from occuring at transistor Q21.

Transistors Q5 and Q6 and associated circuitry provide a conventional multivibrator. The operation of the multivibrator is to divide the 60 Hz frequency occuring on the power supply and provide an input to transistor Q7. The effect of the multivibrator is to enable transistor Q8 to drive the motor only on alternate cycles. This ensures that sufficient time is available for transistor Q24 to supply a voltage representing the speed of the motor to capacitor C17. Otherwise, the motor time constants may impede proper operation of the circuit.

Figure 8:
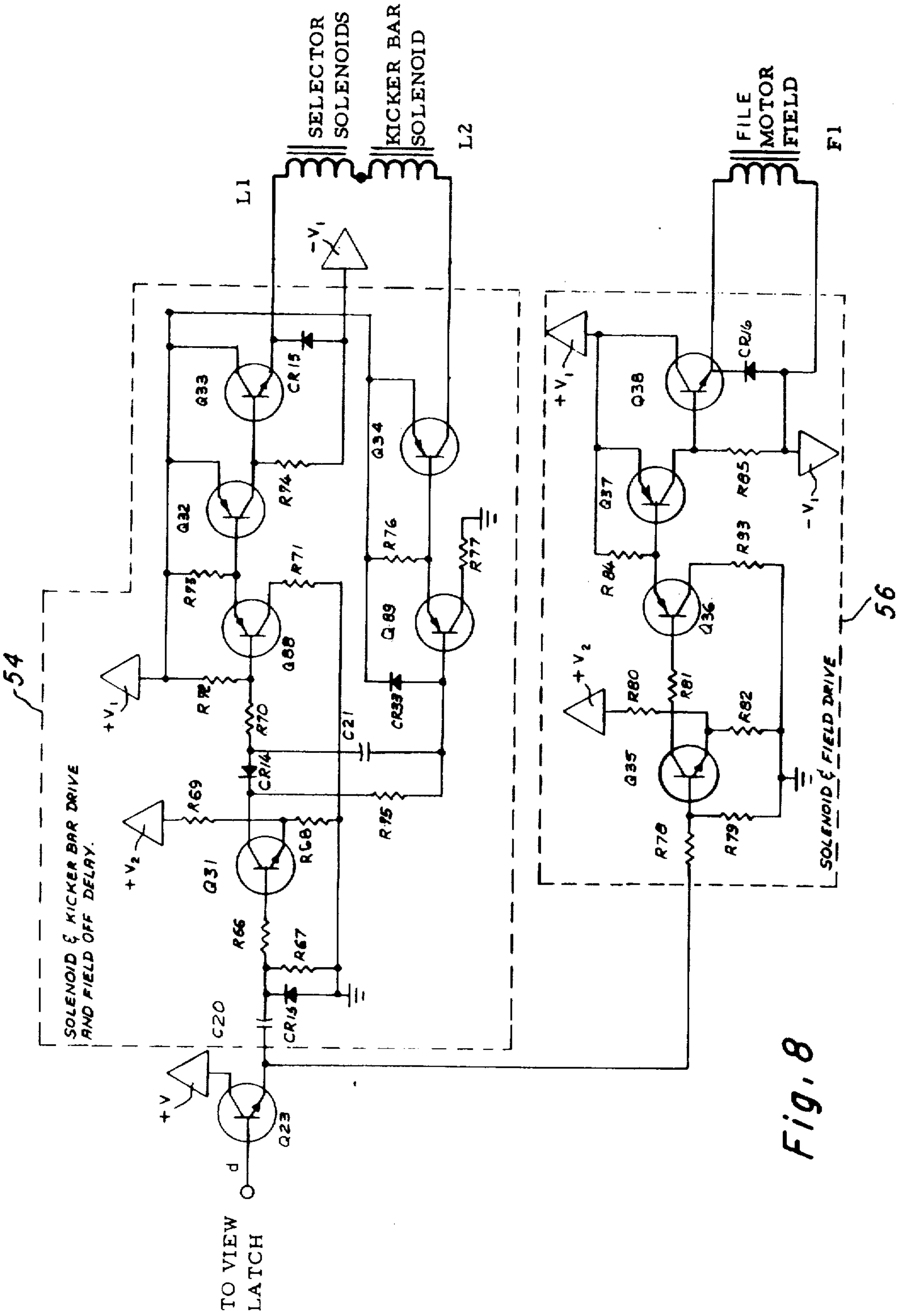

With reference to FIG. 8, there is depicted circuits that may be utilized for the Solenoid and Kicker Bar Drive and Field Off Delay 54 and the Solenoid and Field Drive 56. An input to these circuits is provided from the View Latch circuit 52 through npn transistor Q23.

Solenoid and Kicker Bar Drive and Field Off Delay — With reference to the Solenoid and Kicker Bar Drive and Field Off Delay circuit 54, this circuit comprises transistors Q31–Q34, Q88 and Q89, resistors R66-R77, capacitors C20 and C21, diodes CR13–CR15 and CR33, and associated power supply voltages. The input from the View Latch circuit 52 is coupled to the Solenoid and Kicker Bar Drive and Field Off Delay circuit 54 through the RC combination C20, R66 and R67. Drive to the selector solenoid coils L-1 is provided through transistor Q33 while drive to the kicker bar solenoid coil L-2 is provided through transistor Q34.

Solenoid and Field Drive — With reference to the Solenoid and Field Drive circuit 56, this circuit comprises transistors Q35-Q38, resistors R78–R85, diode CR16, and associated $V_1$+ and $V_1$− power supply voltages. An input from the View Latch circuit 52 is coupled through transistor Q23 to the base of transistor Q35 through biasing resistors R78 and R79. Transistor Q38 provides drive for the card file motor field F-1.

Figure 9:
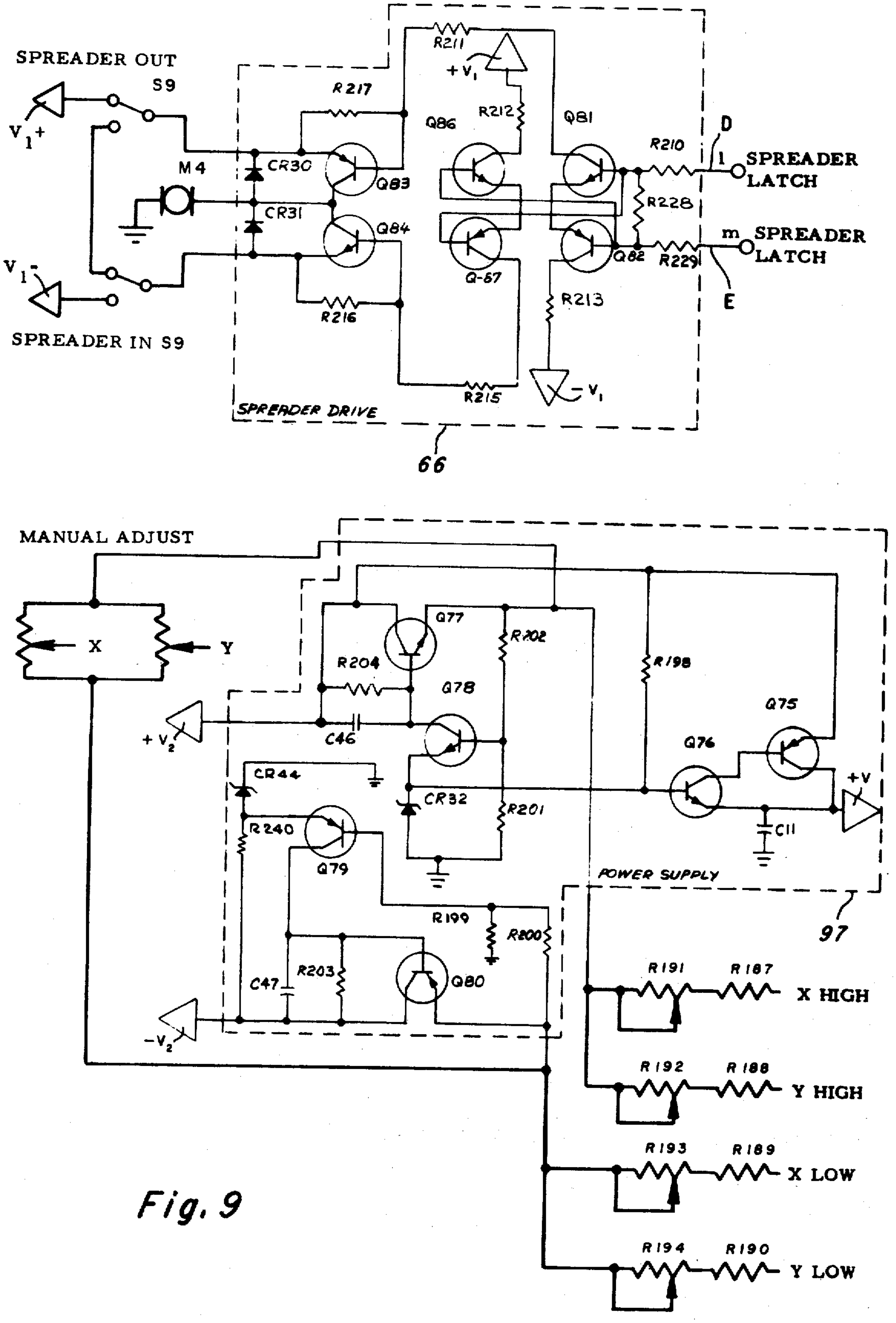

With reference to FIG. 9, there is depicted circuitry that may be utilized for the Spreader Drive 66 and the Power Supply 97.

Spreader Drive — The Spreader Drive circuitry 66 comprises transistors Q81–Q84, Q86 and Q87, resistors R210–R213, R215–R217, R228 and R229, diodes CR30 and CR31, and appropriate DC logic supplies and AC drive voltages. Transistors Q83 and Q84 function to connect the motor M4 to a $V_1$+ power supply or a $V_1$− power supply, respectively, via Spreader Out switch S-8 and Spreader In switch S-9. Transistors Q81, Q82, Q86 and Q87 function as a DC isolator circuit to isolate common mode noise problems by considering only the differential mode component between the inputs D and E.

Logic level DC input signals are applied to inputs D and E. The logic level inputs are derived from a common power supply and, to prevent inadvertent spurious triggering, the common mode noise is eliminated by considering only the difference between the two inputs. The function of the isolator circuit is to couple logic from inputs D and E to control application of AC power to the motor M4. Since AC component noise may be impressed on logic signals applied to terminals D and E, the absolute potential of these logic inputs is not known with respect to the positive and negative full-wave rectified power supply voltages $+V_1$ and $-V_1$. For proper operation, however, the absolute value of the potential at D or E is required to be within the range of $-V_1$ to $+V_1$.

Three conditions may exist between inputs D and E; that is, input D may be more positive than input E; input E may be more positive than input D; or the two inputs may be the same value. The relative DC level between inputs D and E may be used to control logic functions. For example, assume that the DC level of input D is more positive than input E. In this case, resistors R210 and R229 couple this information to the bases of npn transistor Q81 and pnp transistor Q82, respectively. The emitters of transistors Q81 and Q82 are connected in series. With the base of Q81 sufficiently more positive than the base of Q82, both transistors are turned on and conduct current through resistors R213 and R211 into the base of drive transistor Q83. This current saturates Q83 and provides positive power for the motor M4. In addition, the differential voltage between inputs D and E is coupled to the base of pnp transistor Q87 being serially connected to the emitter of Q86. Under the same conditions, that is, with D more positive than E, the base of Q87 is more positive than the base of Q86. This turns both transistors off, preventing any current from being conducted through resistors R215 and thus ensures that drive transistor Q84 is in the off condition. However, when input E is more positive than input D, transistors Q86 and Q87 are biased into conduction and saturate drive transistor Q84, providing negative power to the motor M4. Similarly, in this condition, transistors Q81, Q82 and Q83 are biased off. Diodes CR30 and CR31 prevent any inductance kickback. The action of resistor R228 is to insure that a sufficiently large differential voltage is present between inputs D and E prior to effecting a logic coupling function. As may be seen, since only the differential voltage between inputs D and E is considered, any common mode noise applied simultaneously to both inputs is cancelled. In a condition wherein inputs D and E are equal, no output drive occurs. The effect of resistors R216 and R217 is to prevent leakage current from inadvertently biasing transistors Q83 and Q84 to the on condition.

The spreader motor is thus controlled to operate in response to logic signals as follows:

| | D | E |
|---|---|---|
| Go out | 0 | 1 |
| Go in | 1 | 0 |

For a more detailed description of the DC isolator circuit, reference copending application Ser. No. 103,965 entitled "DC Isolator Circuit", filed concurrently herewith and assigned to the same assignee.

Power Supply — The Power Supply circuit 97 comprises transistors Q75–Q80, resistors R187–R194, R198–R204, R240, capacitors C11, C46 and C47 and zener diodes CR44 and CR32. The power supply provides a V+ logic level voltage and AC drive voltages $\pm V_1$ and $\pm V_2$.

Figure 10:
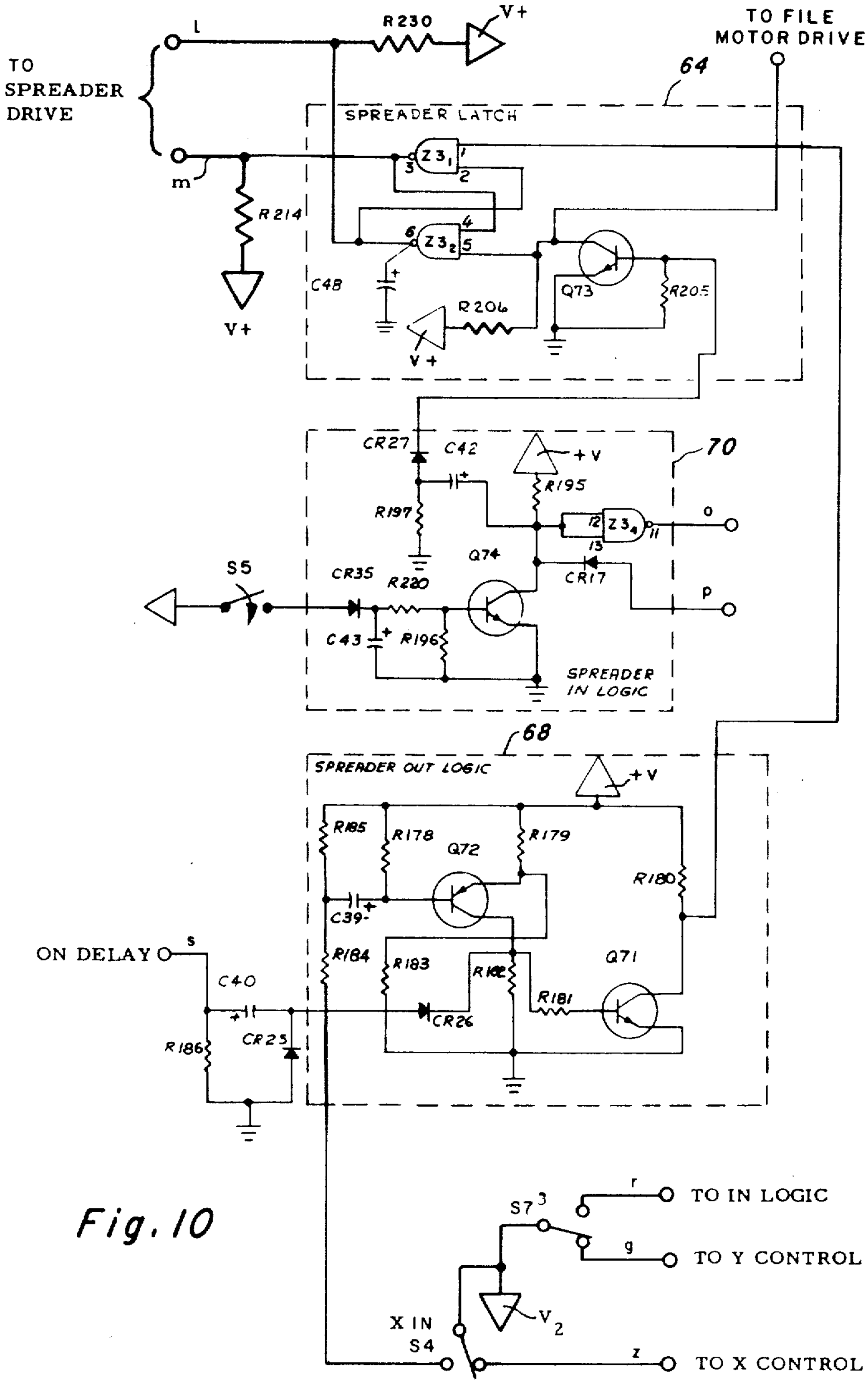

With reference to FIG. 10, there is depicted logic and electrical circuits operable for the Spreader Latch circuit 64, the Spreader In Logic circuit 70, and the Spreader Out Logic 68.

Spreader Latch — The Spreader Latch circuit 64 comprises an npn transistor Q73, resistors R205 and R206, capacitor C48, and a pair of NAND gates $Z3_1$ and $Z3_2$ interconnected to form a latch. The outputs from the NAND gates are taken respectively from pin 3 and pin 6 and are respectively applied to the Spreader Drive circuitry 66 to control operation of the spreader drive motor M4. The logic state of the output of the latch formed by NAND gates $Z3_1$ and $Z3_2$ is controlled by inputs to pin 1 from the Spreader Out Logic circuitry 68 and an input from the Spreader In Logic circuit 70 applied through transistor Q73 to pin 5 of NAND gate $Z3_2$. A signal is applied to the collector of transistor Q73 from the File Motor Drive circuit 76 to prevent the spreader latch from enabling the Spreader Drive circuitry 66 during file motor operation.

Spreader In Logic — The Spreader In Logic circuit 70 comprises an npn transistor Q74, NAND gate $Z3_4$, resistors R195–R197 and R220, capacitors C42 and C43, and diodes CR17 and CR27. A signal from the Spreader In switch S5 is applied to the biasing arrangement of R220, C43 and R196 to the base of transistor Q74. The logic state of NAND gate $Z3_4$ is controlled by signals from transistor Q74 and from the Axes Position Latch 62.

Spreader Out Logic — The Spreader Out Logic 68 comprises transistors Q71 and Q72, resistors R178-R186, capacitors C39 and C40 and diodes CR25 and CR26. The Spreader Out Logic receives an input from the On Delay circuit 60 and from the X In switch S4. The X In signal is applied to the base of transistor Q72 through a biasing circuit comprising R184, R185, R178 and C39. An output of transistor Q71 is applied to the Spreader Latch circuit 64.

Figure 11:
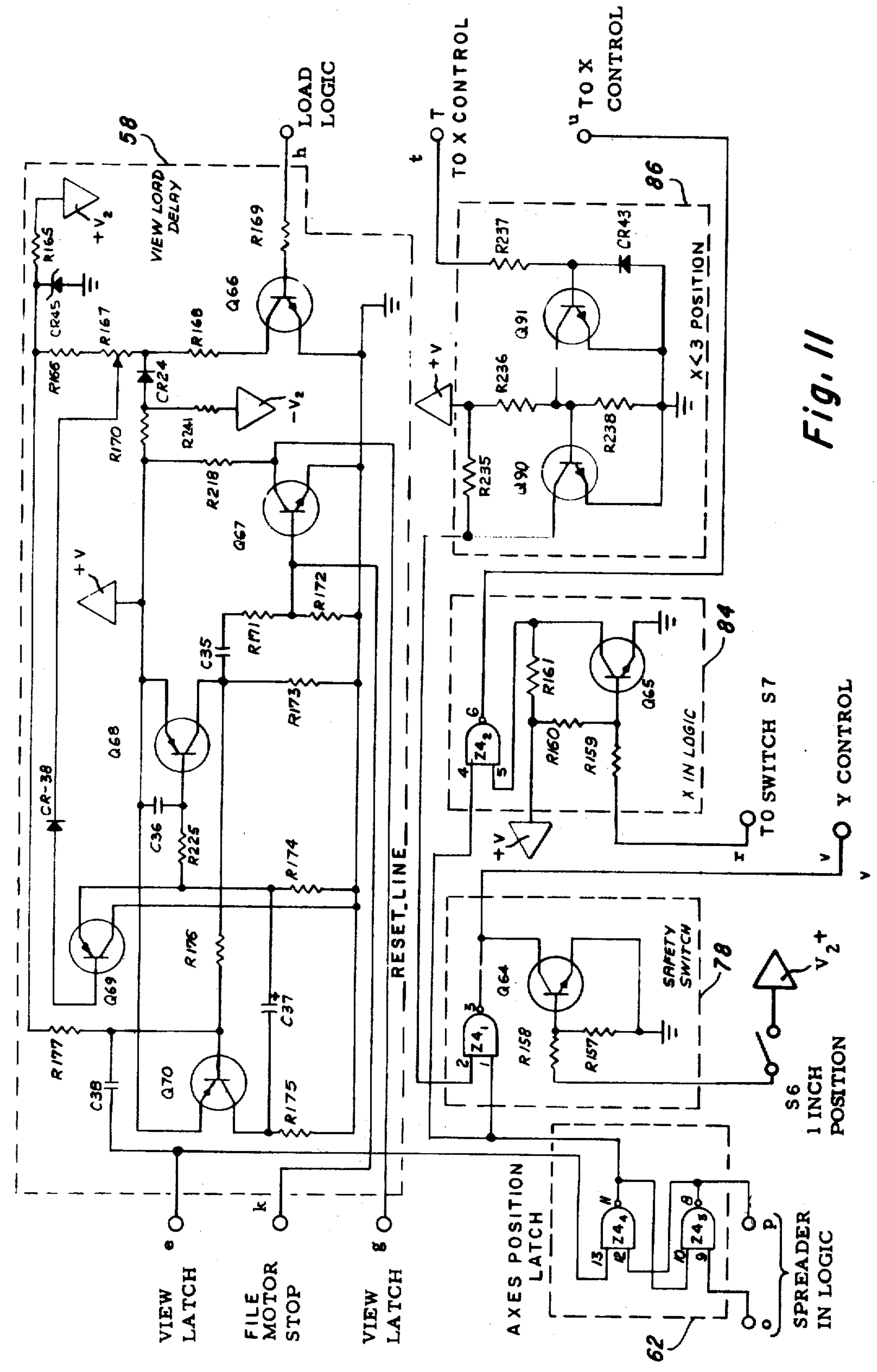

With reference now to FIG. 11, circuits are schematically depicted that may be utilized for the View Load Delay 58, the Axes Position Latch 62, Safety Switch 78, the X In Logic 84, and the X<3 Position 86.

View Load Delay — With reference to the View Load Delay circuit 58, there is provided a resettable one-shot timing capability. In addition, the circuit provides a programmable delay allowing the one-shot timer to begin and operate over the normal one-shot time or to be reset to the programmable time any time during the one-shot cycle. The View Load Delay circuit comprises transistors Q66–Q70, resistors R165-R177, R218, R225, R241, capacitors C35–C38, diodes CR24, CR38 and zener diode CR45. Transistors Q68 and Q70 form the one-shot action, transistor Q67 being the pulse former for the output. The output pulse comprises a reset signal that is applied to the View Latch circuit 52 and the Load Latch circuit 94. Transistors Q69 and Q66 modify the operation of the one-shot to the reset configuration. The timing and the reset mode are controlled by variable resistor R167. An input from the Load Logic circuitry 95 is applied to the base of transistor Q66 and controls the operation of the reset capability. An input to the base of transistor Q67 provides the capability of artificially entering a termination input to the transistor Q67. This input is provided by the File Stop circuit 74; that is, when the File Motor Drive 76 receives a stop command signifying that the desired microfische has been selected and is ready for display, operation of the timing circuit of the View Load Delay 58 is terminated.

In operation, a negative pulse from the View Latch is AC-coupled to the base of pnp transistor Q70 momentarily biasing this device into conduction, thereby coupling a positive pulse through capacitor C37. This positive pulse is applied to the base os pnp transistor Q68, which is normally biased to be in the "on" state. The positive pulse from capacitor C37 drives the collector of Q68 to a more negative value. Positive feedback from the collector of transistor Q68 to the base of transistor Q70 is provided by resistor R176. This feedback ensures that both transistors completely change state, that is, transistor Q70 is completely biased "on" and transistor Q68 is biased "off". They will remain in the changed state until capacitor C37 discharges through resistor R174 to a sufficiently low voltage which will allow Q68 to begin to turn on again. As Q68 begins to turn on, the positive feedback effect causes transistor Q68 to return to its normally "on" state and transistor Q70 to return to its normally "off" state. The output of transistor Q68 is AC-coupled into the base of npn transistor Q67 by capacitor C35, and resistor R171. Transistor Q67 is biased on during the interval required to charge capacitor C35, providing the reset output pulse. When capacitor C37 becomes charged, transistor Q67 turns off, hence the one-shot output pulse.

The timing function of the one-shot circuit, that is, the amount of delay, is controlled by capacitor C37 and resistor R174. In the normal untriggered state, that is, prior to a signal from the View Latch, the potential seen at the collector of Q70 is ground potential and the potential seen at the junction of capacitor C37 and resistor R174 is approximately +V. In the triggered state, Q70 saturates and the potential seen at the collector of Q70 goes to approximately V and the potential at resistor R174 simultaneously goes to approximately twice the value of V. The timing function of the one-shot circuit is determined by the time it takes resistor R174 to discharge capacitor C37 back to a potential slightly less than the value of V. The values of capacitor C37 and resistor R174 may be chosen to effect a desired delay of, for example, 6–7 seconds. The function of capacitor C36 is to prevent noise and transient spikes from inadvertently triggering the one-shot output.

The time span of the one-shot delay may be modified by the action of transistors Q69 and Q66. Normally, the action of resistor R166, potentiometer 167, and resistor R168 have no effect on the circuit operation since npn transistor Q66 is normally biased off. Thus, the base of pnp transistor Q69 is biased with a voltage of, for example, +10 volts as governed by zener diode CR45 and the voltage drop through diode CR38. However, if the one-shot circuit is in operation, that is, an input has been received from the View Latch, and transistor Q66 is biased into conduction by a signal from the Load Logic 95, the duration of the one-shot delay may be modified by biasing Q69 into conduction, thereby discharging capacitor C37 and enabling Q68 to again be biased on. Potentiometer R167 controls the bias applied to the base of transistor Q69 when transistor Q66 is saturated and thereby controls the amount of time required to sufficiently discharge capacitor C37 to effect the one-shot output.

Resistors R170 and R241 create external biasing for the modification portion of the one-shot circuit while diode CR24 provides temperature compensation for the effects of transistors Q70, Q68, Q69 and diode CR38. Resistor R165 limits the current through diode CR45, and resistor R169 provides isolation for transistor Q66.

A more detailed description of the timing circuit may be found in copending application Ser. No. 103,964 entitled "Resettable Timing Circuit" filed concurrently herewith and assigned to the same asignee.

Axes Position Latch — The Axes Position Latch 62 comprises a pair of interconnected NAND gates $Z4_3$ and $Z4_4$. Inputs to the Axes Position Latch are provided from the View Latch circuit 52 and the Spreader In Logic circuit 64. The input from the View Latch circuit is operative to set the logic state of the Axes Position Latch 62 to a predetermined logic state signifying that the X and Y servo motors are to be moved to the home position. The input from the Spreader In Logic is applied to pin 9 of NAND gate $Z4_3$ and is operative to set the logic of the Axes Position Latch 62 to a logic state signifying that the X and Y servo motors are to operate in a display mode, taking their driving voltage from the desired coordinate display position entered via the keyboard 18 (FIG. 1). The output of the Axes Position Latch 62 is taken from pin 11 of NAND gate $Z4_4$ and is applied to the Safety Switch 78 and to the X In Logic 84.

Safety Switch — The Safety Switch 78 comprises a NAND gate $Z4_1$ and an npn transistor Q64. The NAND gate $Z4_1$ provides at pin 3 an enabling output signal that is connected to the Y Control circuit 80, enabling operation of the Y servo motor whenever inputs are simultaneously present at pins 1 and 2 of the NAND gate $Z4_1$. Input 1 is derived from the Axes Position Latch 62 and input 2 is derived from the X<3 Position circuit 86. When the Axes Position Latch input indicates that the Y axis is to be driven to the home position and the X axis is located at a position less than 3, the NAND gate $Z4_1$ operates to provide an enable signal to the Y Control circuit. Whenever the X servo motor axis is positioned to a location within 1 inch of the home position the one inch position switch S6 is activated and provides a signal to the base of transistor Q64 through biasing resistors R157 and R158. This signal operates to bias on transistor Q64 and clamp the output of NAND gate $Z4_1$ to ground, thereby locking the Y servo in the home position at all times when the servo axis is within one inch of the home position, thereby ensuring that no damage occurs due to interferences of the Y servo mechanism with the platen.

X In Logic — The X In Logic circuit 84 comprises a NAND gate $Z4_2$, an npn transistor Q65 and biasing resistors R160 and R161. The output at pin 6 of the NAND gate $Z4_2$ is applied to the X Control circuitry 88 and enables the X servo to be driven to the home position. An output at pin 6 of NAND gate $Z4_2$ is generated, however, only when inputs at pins 4 and 5 are present. The input at pin 4 is generated from the output of the Axes Position Latch 62. When the Axes Position Latch is set to the logic state indicating that the X and Y servos are to be moved to the home position, a logic signal is provided at pin 4 of NAND gate $Z4_2$. A logic signal at pin 5 is generated by termination of conduction of transistor Q65, which is normally biased "on" by a V+ voltage applied through biasing resistors R160 and R161. The emitter of Q65 is connected to ground. Transistor Q65 is switched to the non-conductive state in response to a $V_2-$ voltage being applied through resistor R159 to the base of transistor Q65. This negative voltage is applied whenever the Y bottom switch S7 is activated in response to the Y servo axis being positioned in the Y home location. Thus, an enable signal for the X axis to be positioned in the home position is obtained only when the Axes Position Latch indicates that X should be in the home position and the Y servo axis has already been positioned to the home location.

X<3 position — The X<3 Position circuit 86 comprises NPN transistors Q90 and Q91, resistors R235-R238, and diode CR43. The X<3 Position circuit 86 receives an input from the X Control circuit 88; whenever the X servo axis is positioned to a location less than 3, an enable pulse is provided to the NAND gate $Z4_1$ of the Safety Switch 78.

Figure 12:
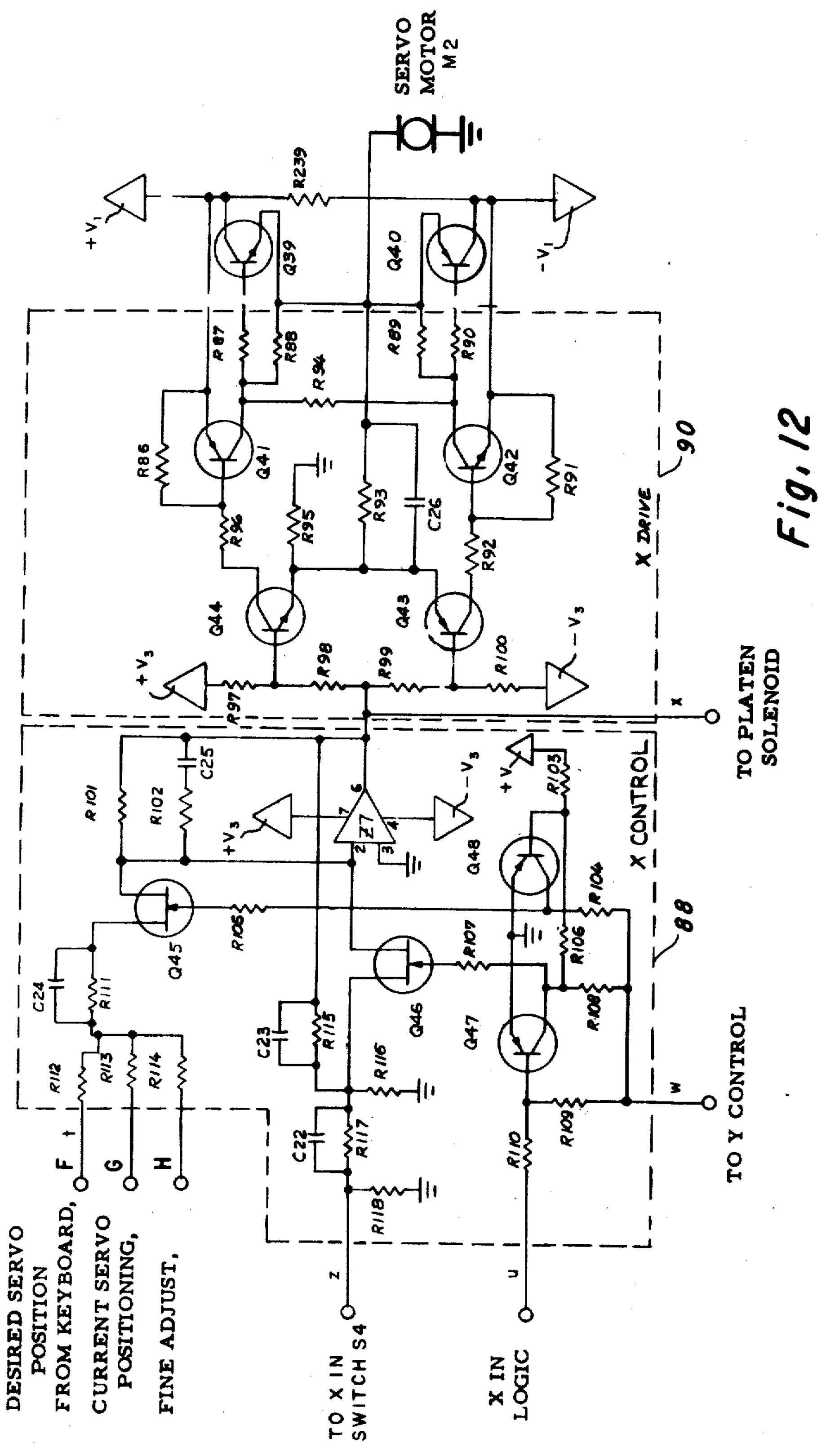

With reference now to FIG. 12, there is depicted therein schematics of circuits that may be utilized for the X Control circuit 88 and the X Drive circuit 90.

X Control — The X Control circuit comprises transistors Q45–Q48, resistors R101–R118, capacitors C22–C25 and a high gain amplifier Z7. The X Control circuit receives inputs from the X In Logic circuit 84 and the Y Control circuit 80.

X Drive – The X Drive circuitry 90 comprises transistora Q39–Q44, resistors R86–R100 and capacitor C26. Transistors Q39–Q40 provide drive power for the X servo motor M2.

The X Control and the X Drive circuits provide high speed drive capability to the X servo motor M2. Conventional servo motor drive circuitry generally provides full wave rectified unfiltered power. Since this type of power periodically goes to approximately zero voltage, armature braking occurs during that time when the drive voltage is below the back EMF of the motor, thus retarding the speed of the motor. In accordance with the circuits depicted in FIG. 12, however, armature braking due to the back EMF of the motor is prevented, thereby increasing the speed of operation of the X servo motor M2.

In operation, the desired X position of the servo axis is entered in the form of a voltage at terminal F. The actual position of the X servo motor axis is represented by a voltage that is applied to terminal G. A voltage may be applied to terminal H to achieve fine tuning adjustments of the position of the X servo axis. A signal from the X In Logic 84 is applied through biasing resistor R110 to the base of transistor Q47. The state of the logic signal from the X In Logic determines whether the X servo motor M2 operates in the servo (display) mode or in the home position mode. When the input to transistor Q47 is at ground potential, that is, logic state 1, transistor Q45 is saturated causing the system to operate in the servo mode. That is, the inputs from terminals F, G and H are transmitted through transistor Q45 to the high gain amplifier Z7. When input transistor Q47 is caused to go to the negative supply, that is, logic state 0, transistor Q45 becomes biased open, causing transistor Q46 to saturate. When transistor Q46 is saturated, the X servo is driven to one end. A microswitch S4 (reference FIG. 10) is activated when the X servo axis has arrived at the home position. Switch S4 to operates to apply a minus $V_2$ power supply voltage to the transistor Q46.

The drive section applies positive or negative power supply voltages to a motor M2. The function of the drive section is to apply maximum drive to the motor M2 and to prevent armature braking of the motor when the back EMF of the motor exceeds the drive voltage. Drive of motor M2 is accomplished in the forward or positive direction by a positive output from amplifier Z7. The positive output is conducted through resistor R98 to the base of npn transistor Q44, thus biasing this transistor "on". The emitter-collector circuit of Q44 conducts current through resistor R96 to the base of PNP transistor Q41 providing a voltage level there that is essentially the same level as the voltage across the motor M2. The positive power supply $V_1$, is connected to the emitter of transistor Q41, and when this voltage is more positive than the voltage at the base of transistor Q41 (that is, when the back EMF of the motor is less than the power supply voltage) transistor Q41 is biased on. Conduction of transistor Q41 provides a current through R87 to the base of npn transistor Q39 and biases Q39 on, providing $V_1$ drive power to the motor M2. In the event that the level of the positive power supply $V_1$ is below the back EMF level of the motor M2, Q41 will be reverse biased. When Q41 is biased off, Q39 remains off since no biasing signal is provided through the resistor R87.

When negative drive is required, a negative output from Z7 is applied through resistor R99 to the base of pnp transistor Q43, biasing Q43 into conduction. This in turn provides drive through resistor R92 to the base of npn transistor Q42. Transistor Q42 is biased on when the minus power supply $V_1$ is more negative than the back EMF of motor M2. Conduction of transistor Q42 provides current through resistor R90 biasing on drive transistor Q40. When the negative power supply is more positive than the back EMF of the motor M2, transistor Q42 will not be turned on since the emitter base junction is reverse biased. This prevents a bias signal from being applied to transistor Q40. The effect of preventing either transistors Q40 or Q39 from being biased on during the time that the power supply voltage is within the range or less than the back EMF of the motor M2 is to enable the drive circuitry to power a DC servo motor at maximum speed without armature braking. Preventing armature braking increases the maximum speed of the servo motor by as much as 30–40 percent. Resistors R93 and R95 in conjunction with capacitor C26, provide feedback for the output drive and stabilization to prevent servo oscillation. Resistors R100, R99, R98 and R97 provide biasing to prevent crossover distortion that could otherwise occur due to the $V_{ce}$ potentials of transistors Q43 and Q44.

Figure 13:
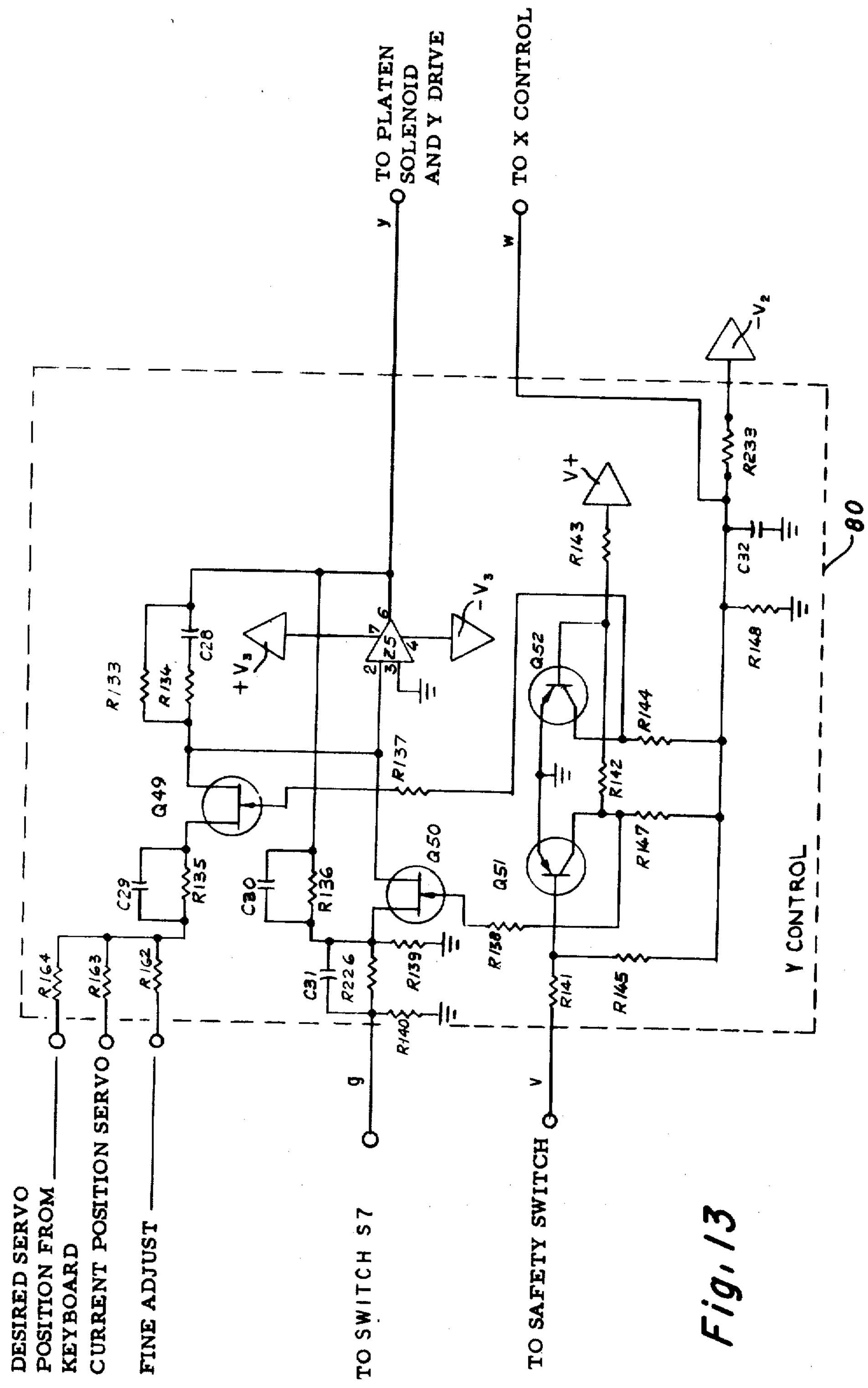

Y Control — With reference now to FIG. 13, there is depicted therein a schematic circuit that may be utilized for the Y Control circuit 80. This circuit is similar to the X Control circuit 88 shown in FIG. 12 and operation of the circuit is the same. The Y Control circuit 80 comprises transistors Q49–Q52, resistors R133–R145, R147 and R148, R162–R164 and R233, capacitors C29–C32 and high gain amplifier Z5. Inputs representing the desired servo position, current servo position, and the fine adjust tuning is provided through resistors R164, R163 and R162 respectively. An enable signal is applied to the base of transistor Q51 from the Safety Switch circuit 78, and a signal indicating that Y has arrived at the home position is applied from terminal the switch S7 to transistor Q50 through the biasing circuit comprising resistors R139, R140, R226 and capacitor C31. An output is also applied to the Platen Solenoid circuit 96 whenever a servo output is present.

Figure 14:
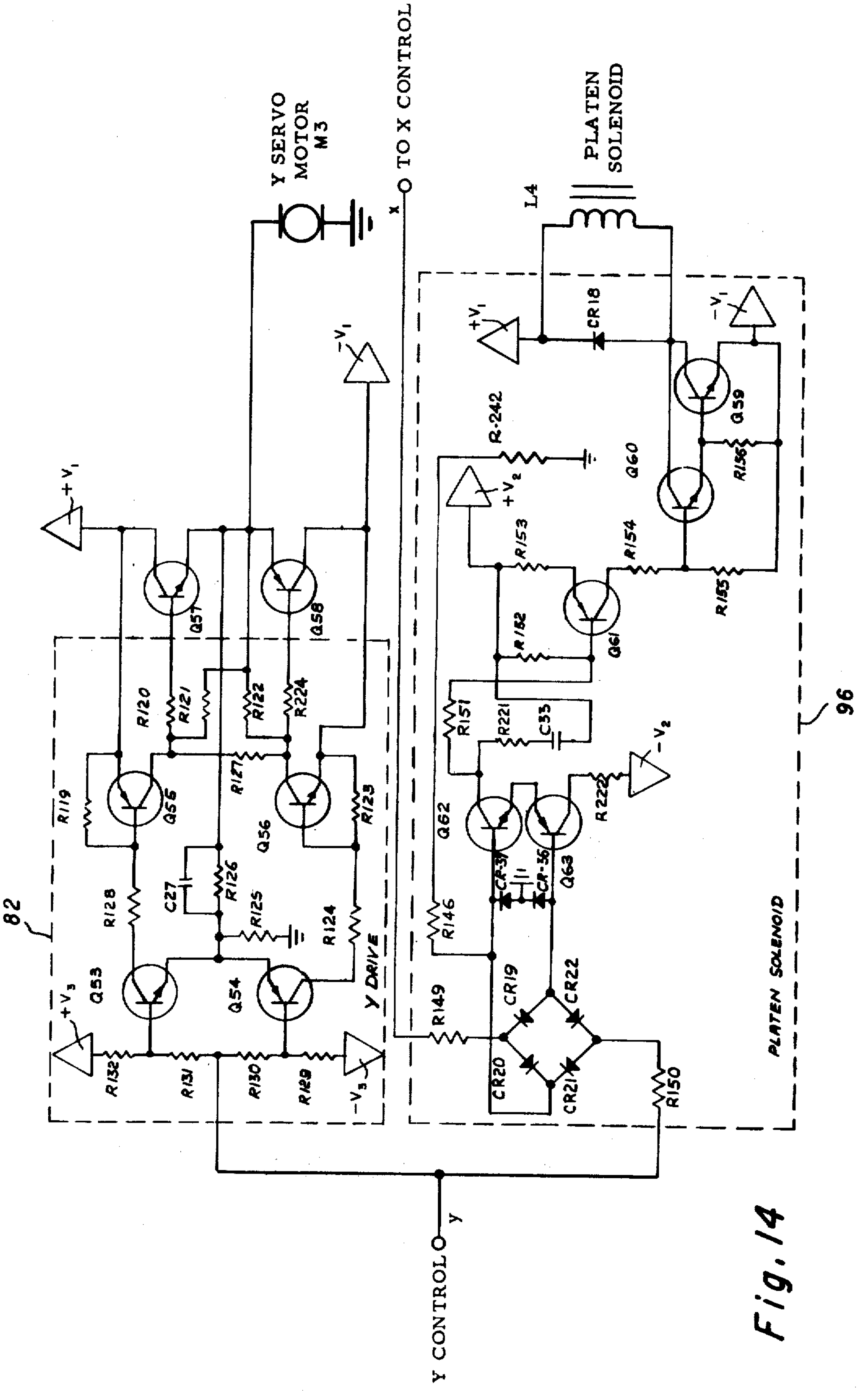

With reference now to FIG. 14, there is depicted circuitry that may be utilized for the Y Drive 82 and the Platen Solenoid Control 96.

Y Drive — The Y Drive 82 comprises transistors Q53–Q58, resistors R119–R131, R224 and capacitor C27. Operation of the Y Drive circuit 82 is similar to operation of the X Drive circuit 90. The Y servo motor M3 receives drive power through transistors Q57 and Q58, respectively.

A more detailed description of the servo drive circuit for the X and Y servo may be found in copending application Ser. No. 104,042 entitled "High Speed Positioning System" filed concurrently herewith and assigned to the same assignee.

Platen Solenoid Control — With reference to the Platen Solenoid Control 96, this circuit comprises transistors Q59–Q63, resistors R146, R149–R156, R221, R222 and R242, capacitor C33 and diodes CR18–CR22, CR36 and CR37. The Platen Solenoid circuit receives an input from the Y Control circuit 80 and the X Control 88 whenever either the X or Y servo motors are energized. These input signals enable operation of the Platen Solenoid coil L4 which functions to position the platen away from the microfische so that damage will not occur to the microfilm.

The circuits depicted in FIGS. 5–14 have been shown as examples only of circuits that may be utilized to accomplish the function as shown in the block diagram in FIG. 3. It is to be appreciated, however, by those skilled in the art that modifications to the details of the circuits may be made without departing from the scope or spirit of the present invention.

What is claimed is:

1. A high speed data retrieval and display system comprising:

a. data storage means for storing a plurality of data items;

b. selector means for addressing a preselected data item;

c. alternating current drive means for sequentially scanning said data items with said selector means; and d. control circuitry coupled to said drive means for regulating the speed of scan, said circuitry including means operable during successive cycles of drive power to alternately sense the actual speed of said drive means and regulate said speed to a preselected value.

2. A high speed data retrieval and display system as set forth in claim 1 wherein said storage means comprises a rotary file.

3. A high speed data retrieval and display system as set forth in claim 2 wherein said data items comprise a plurality of microfische, each having a tab that defines a predetermined binary code.

4. A high speed data retrieval and display system as set forth in claim 3 wherein said selector means comprises a plurality of bars that may be set to correspond to a predetermined binary code.

5. A high speed data retrieval and display system as set forth in claim 1 wherein said control circuitry includes transistor isolation means for isolating D.C. logic level signals from said alternating current drive means.

6. A high speed data retrieval and display system as set forth in claim 1 wherein said control circuitry includes a resettable solid state timing circuit for providing a predetermined and variable delay.

7. A high speed data retrieval and display system as set forth in claim 1 including positioning means for positioning a selected data item for display, said positioning means including a servo system operable with unfiltered unregulated A.C. drive voltage, said servo system including transistor circuitry for preventing armature breaking.

* * * * *

UNITED STATES PATENT OFFICE
CERTIFICATE OF CORRECTION

Patent No. 3,704,451 Dated Nov. 28, 1972

Inventor(s) Samuel Reader Pearson

It is certified that error appears in the above-identified patent and that said Letters Patent are hereby corrected as shown below:

On the cover sheet under "Attorney", the name of

-- Harold Levine -- should be inserted.

Signed and sealed this 1st day of May 1973.

(SEAL)
Attest:

EDWARD M.FLETCHER,JR.
Attesting Officer

ROBERT GOTTSCHALK
Commissioner of Patents